(12) United States Patent
Thomas

(10) Patent No.: US 12,499,719 B2
(45) Date of Patent: Dec. 16, 2025

(54) VEHICLE BACKUP MONITORING AND REPORTING SYSTEM

(71) Applicant: Oshkosh Corporation, Oshkosh, WI (US)

(72) Inventor: Brian Thomas, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 252 days.

(21) Appl. No.: 18/312,256

(22) Filed: May 4, 2023

(65) Prior Publication Data

US 2023/0360450 A1  Nov. 9, 2023

Related U.S. Application Data

(60) Provisional application No. 63/338,600, filed on May 5, 2022.

(51) Int. Cl.
*G07C 5/06* (2006.01)
*G01C 21/34* (2006.01)
*G06Q 10/0631* (2023.01)

(52) U.S. Cl.
CPC .......... *G07C 5/06* (2013.01); *G01C 21/3453* (2013.01); *G06Q 10/06312* (2013.01)

(58) Field of Classification Search
CPC ...... G07C 5/008; G07C 5/085; G07C 5/0825; G07C 5/0816; G07C 5/08; G07C 5/06; G07C 5/0841; B65F 3/00; H04L 67/12; H04L 2012/40215; H04L 2012/40273; H04W 4/44; H04W 4/40; G06Q 10/06312; G06Q 10/0639; G06Q 10/0631; G06Q 10/06311; G06Q 10/08; G06Q 10/06; G06Q 50/40; G08G 1/096827; G08G 1/096844; B60K 35/00; B60K 35/22; B60K 35/28; B60W 50/14; B60W 60/001; B60W 2050/146; G01C 21/26; G01C 21/3415; G01C 21/34; G01C 21/3453

See application file for complete search history.

(56) References Cited

U.S. PATENT DOCUMENTS

2010/0094688 A1 * 4/2010 Olsen, III ........ G06Q 10/06398
                                                              705/7.42
2013/0030873 A1 * 1/2013 Davidson ............. G07C 5/0808
                                                              705/7.36

(Continued)

FOREIGN PATENT DOCUMENTS

CA      2809689 A1 *  9/2014 ............. G06Q 40/08
CA      2824736 C  *  3/2019 ............. B60D 1/245

(Continued)

*Primary Examiner* — Hitesh Patel
*Assistant Examiner* — Elle Rose Knudson
(74) *Attorney, Agent, or Firm* — Foley & Lardner LLP

(57) ABSTRACT

A system for monitoring operation of a vehicle. The system includes a device configured to collect data pertaining to operations of the vehicle and one or more processing circuits in communication with the device. The one or more processing circuits configured to receive, from the device responsive to a first operation of the vehicle, data pertaining to the first operation of the vehicle, determine, using the data pertaining to the first operation of the vehicle, that the first operation of the vehicle includes a vehicle backup, and provide, to a user device, a user interface that displays an indication of the vehicle backup.

11 Claims, 24 Drawing Sheets

(56) References Cited

U.S. PATENT DOCUMENTS

| | | | | |
|---|---|---|---|---|
| 2014/0180533 | A1* | 6/2014 | Bowman | G06Q 40/08 701/33.4 |
| 2014/0372904 | A1* | 12/2014 | Liu | G01C 21/3415 715/753 |
| 2022/0080803 | A1* | 3/2022 | Lavrich | G07C 5/0825 |

FOREIGN PATENT DOCUMENTS

| | | | | |
|---|---|---|---|---|
| CN | 101896950 A | * | 11/2010 | G07C 5/085 |
| CN | 113050643 A | * | 6/2021 | G05D 1/0223 |
| EP | 3667583 A1 | * | 6/2020 | |

\* cited by examiner

1300

| Date/Time | Speed | Heading | Elevation |
|---|---|---|---|
| - | 0 | ∧ | 750 FT |
| - | 0 | ∧ | 750 FT |
| - | 0 | ∧ | 750 FT |
| - | 0 | ∧ | 750 FT |
| - | 34 | ∧ | 743.25 FT |
| - | 36 | > | 751.66 FT |
| - | 70 | > | 770.11 FT |
| - | 70 | ∧ | 771.02 FT |
| - | 62 | < | 766.34 FT |
| - | 60 | < | 730.01 FT |
| - | 55 | < | 722.22 FT |

(columns: 1305, 1310, 1315, 1320)

FIG. 13

| INCOMPLETE PICKUPS<br>View the Missed Pickups | | | |
|---|---|---|---|
| Downtime Event 1710 | GPS Location 1715 | Date 1720 | Acknowledged 1725 |
| Blocked Can | , | , | Yes |
| Unable to Reach Can | , | , | Yes |
| Can Missing | , | , | No |
| Unable to Reach Can | , | , | Yes |
| Can Missing | , | , | No |
| Can Missing | , | , | No |
| Blocked Can | , | , | Yes |
| Unable to Reach Can | , | , | Yes |
| Can Missing | , | , | No |
| Unable to Reach Can | , | , | Yes |
| Can Missing | , | , | No |
| Unable to Reach Can | , | , | Yes |
| Can Missing | , | , | No |
| Can Missing | , | , | No |
| Blocked Can | , | , | Yes |
| Unable to Reach Can | , | , | Yes |
| Can Missing | , | , | No |
| Unable to Reach Can | , | , | Yes |

FIG. 17

| 2200 | SUMMARY 2105 | STATUS 2110 | TOTALS 2115 | ANALYTICS 2120 | | |
|---|---|---|---|---|---|---|
| VIN | Truck Status | Body Fuse Status | Hydraulic Heater Circuit Activated | PTO Engaged | Faults | Last Recorded Timestamp |
| | On | On | Yes | On | ① | --- |
| | Off | Off | No | Off | ① | --- |
| | On | On | Yes | On | ◷ | --- |
| | On | On | Yes | On | ◷ | --- |
| | Off | Off | No | Off | ◷ | --- |

FIG. 22

| VIN | SUMMARY | | STATUS | | TOTALS | | ANALYTICS | | | | | |
|---|---|---|---|---|---|---|---|---|---|---|---|---|
| | IDLE TIME HOURS | ENGINE HOURS | DISTANCE MILES | FUEL GALLONS | IDLE FUEL GALLONS | CHASSIS PEAK DAILY SPEED | LIFT COUNT | EJECT COUNT | PACKER COUNT | PUMP HOURS | HYDRAULICS PEAK DAILY TEMPERATURE | LAST RECORDED TIMESTAMP |
| | 19.1 | 34.9 | 521.87 | 101.74 | 16.77 | 68.66 | 46 | 1 | 22 | 38 | 142° | , |
| | 12.05 | 20.2 | 164.04 | 134.67 | 8.72 | 72.04 | 52 | 1 | 18 | 30 | 130° | , |
| | 9.15 | 15.35 | 158.68 | 98.38 | 98.38 | 70.30 | 64 | 2 | 30 | 27 | 155° | , |
| | , | , | , | , | , | , | , | , | , | , | , | , |
| | 6.7 | 11.2 | 101.67 | 52.01 | 7.53 | 66.18 | 44 | 1 | 16 | 33 | 122° | , |

FIG. 23

VEHICLE BACKUP MONITORING AND REPORTING SYSTEM

CROSS-REFERENCE TO RELATED PATENT APPLICATIONS

This application claims the benefit of and priority to U.S. Provisional Patent Application No. 63/338,600, filed on May 5, 2022, the entirety of which is incorporated by reference herein.

BACKGROUND

Vehicles including refuse vehicles may track and record data related to actions performed by the vehicle. Further, this data may be wirelessly transmitted (e.g., to a server, other vehicle, etc.) such that the vehicles actions may be shared with other computing devices.

SUMMARY

At least one embodiment relates to a system for monitoring operation of a vehicle. The system includes a device configured to collect data pertaining to operations of the vehicle and one or more processing circuits in communication with the device. The one or more processing circuits configured to receive, from the device responsive to a first operation of the vehicle, data pertaining to the first operation of the vehicle, determine, using the data pertaining to the first operation of the vehicle, that the first operation of the vehicle includes a vehicle backup, and provide, to a user device, a user interface that displays an indication of the vehicle backup.

At least one embodiment relates to a system for monitoring operation of a vehicle. The system includes a device configured to collect data pertaining to operations of the vehicle and one or more processing circuits in communication with the device. The one or more processing circuits configured to receive data pertaining to a plurality of operations of the vehicle, determine, using the data pertaining to the plurality of operations of the vehicle, a number of vehicle backups performed by the vehicle, associate, using location information included in the data pertaining to the plurality of operations of the vehicle, the number of vehicle backups performed by the vehicle with a route taken by the vehicle, and provide, to a user device, a user interface that displays an indication of the number of vehicle backups and the route taken by the vehicle.

At least one embodiment relates to a system for monitoring operation of a vehicle. The system includes a device configured to collect data pertaining to operations of the vehicle and one or more processing circuits in communication with the device. The one or more processing circuits configured to receive data pertaining to a plurality of operations of the vehicle, determine, using the data pertaining to the plurality of operations of the vehicle, a number of vehicle backups performed by the vehicle, associate, using location information included in the data pertaining to the plurality of operations of the vehicle, the number of vehicle backups performed by the vehicle with a route taken by the vehicle, identify, using the data pertaining to the plurality of operations of the vehicle, a plurality of tasks included along the route taken by the vehicle, and provide, to a user device, a user interface that displays an indication of the route taken by the vehicle, an indication of number of vehicle backups performed by the vehicle, and an indication of the plurality of tasks included along the route taken by the vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 13 is a user interface displaying vehicle information, according to an exemplary embodiment.

FIG. 17 is a user interface displaying vehicle information, according to an exemplary embodiment.

FIG. 22 is a user interface displaying a dashboard, according to an exemplary embodiment.

FIG. 23 is a user interface displaying a dashboard, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, systems and methods for supplying and/or monitoring a service to a customer are shown below. In a typical application, a refuse vehicle travels along a route. While the refuse vehicle is traveling along the route the refuse vehicle may perform a backup maneuver (e.g., the vehicle travels in reverse) and/or other vehicle maneuvers and operations. In one embodiment, the system determines a number of backups (e.g., how many times the vehicle travels backwards) performed by a refuse vehicle during daily operations. The system may utilize data associated with the refuse vehicle to generate one or more reports. The system can provide the reports to a user that is associated with the refuse vehicle and/or be transmitted (e.g., via telematics) to a vehicle monitoring and/or control center. The reports can include information pertaining to the number of backups performed, the route associated with the number of vehicle backups and the vehicle tasks associated with the route (e.g., waste collection stops). The system may be configured to present the data via an interactive graphical user interface that allows a user to visualize the number of backups graphically for individual vehicles and locations at which the backups were performed. It should be appreciated that although the methods herein are described with reference to vehicle backup monitoring and detection, similar methods can be used to monitor other vehicle operations (e.g., body operations such as vehicle unloading, and/or refuse vehicle specific operations such as ejector operation, vehicle capacity monitoring, etc.).

Figure 1:
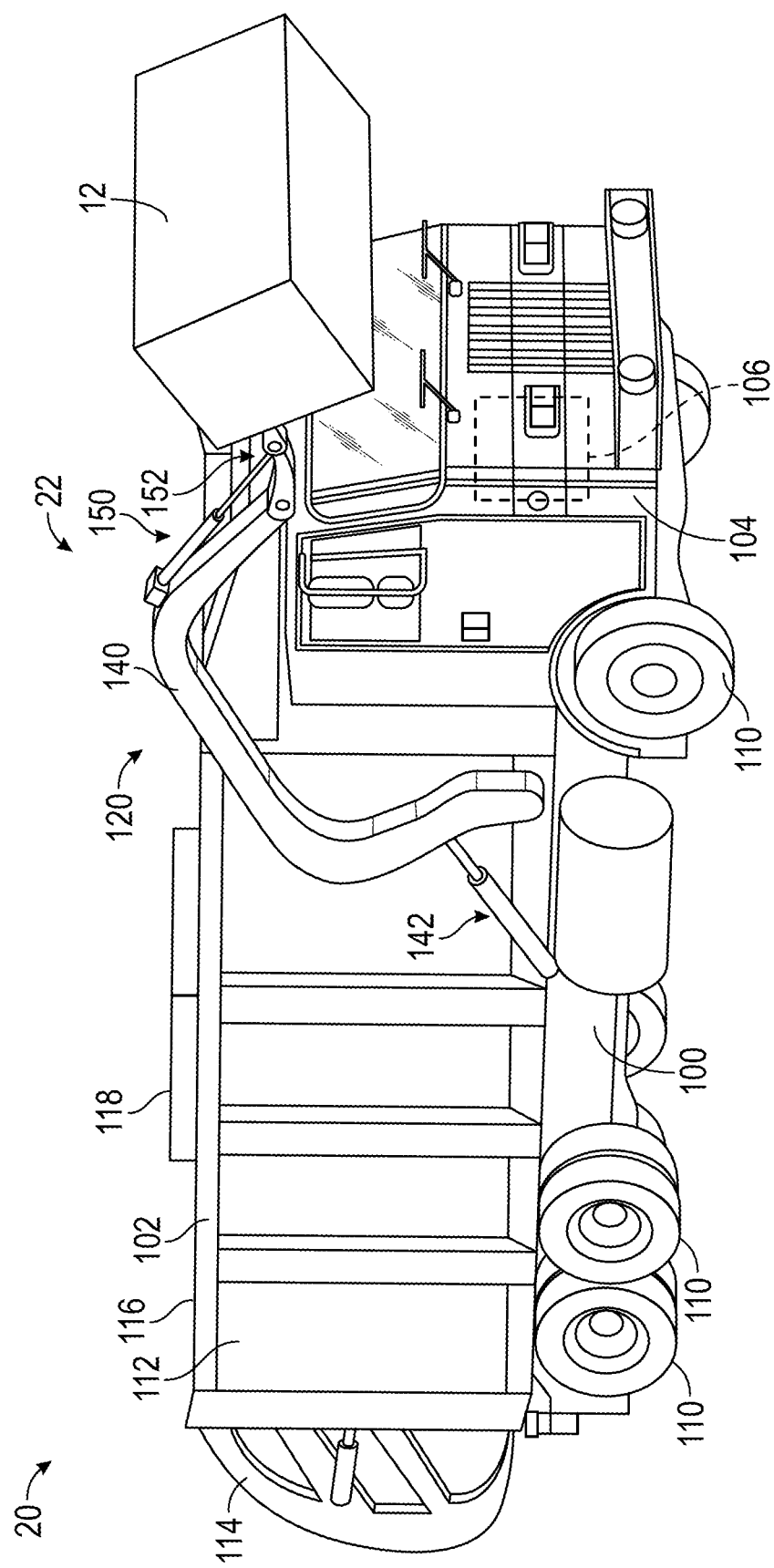
FIG. 1 is a perspective view of a front-loading refuse vehicle, according to an exemplary embodiment.

Referring now to FIG. 1, a refuse vehicle 20 is shown, according to various embodiments. The refuse vehicle 20 may be a garbage truck, a waste collection truck, a sanitation truck, etc., and may be configured as a side-loading refuse truck, front-loading refuse truck, or a rear-loading refuse truck. The refuse vehicle 20, when configured as a front-loading refuse vehicle, may include a collector 22 configured as a front-loading lift assembly. The collector 22 includes a pair of arms, shown as lift arms 140, coupled to the frame 100 and/or the body 102 on either side of the refuse vehicle 20 such that the lift arms 140 extend forward of the cab 104 (e.g., a front-loading refuse vehicle, etc.). In other embodiments, the collector 22 extends rearward of the body 102 (e.g., a rear-loading refuse vehicle, etc.). In still other embodiments, the collector 22 extends from a side of the body 102 (e.g., a side-loading refuse vehicle, etc.). The lift arms 140 may be rotatably coupled to frame 100 with a pivot (e.g., a lug, a shaft, etc.). As shown, the collector 22 includes first actuators, shown as lift arm actuators 142 (e.g., hydraulic cylinders, etc.), coupled to the frame 100 and the lift arms 140. The lift arm actuators 142 are positioned such that extension and retraction thereof rotates the lift arms 140 about an axis extending through the pivot, according to an exemplary embodiment. As shown, the collector 22 further includes a second set of actuators shown as fork actuators 150. The fork actuators 150 are configured to rotate a pair of interfaces devices or end effectors, shown as forks 152, relative to the lift arms 140. The forks 152 are configured to interface with a front-loading refuse container 12. As shown, the refuse container 12 is a dumpster that receives the forks 152 to couple the refuse container 12 to the refuse vehicle 20. In some embodiments, the refuse vehicle 20 includes an adapter for the collector 22 that converts the front-loading refuse vehicle 20 into a side-loading refuse vehicle. The adapter may include an arm that interfaces with side-loading refuse containers (e.g., similar to the grabber assembly 122). The adapter may dump the refuse container 12 into an intermediate basket, which is subsequently dumped into the refuse compartment 120 by the lift arm actuators 142.

Figure 2:
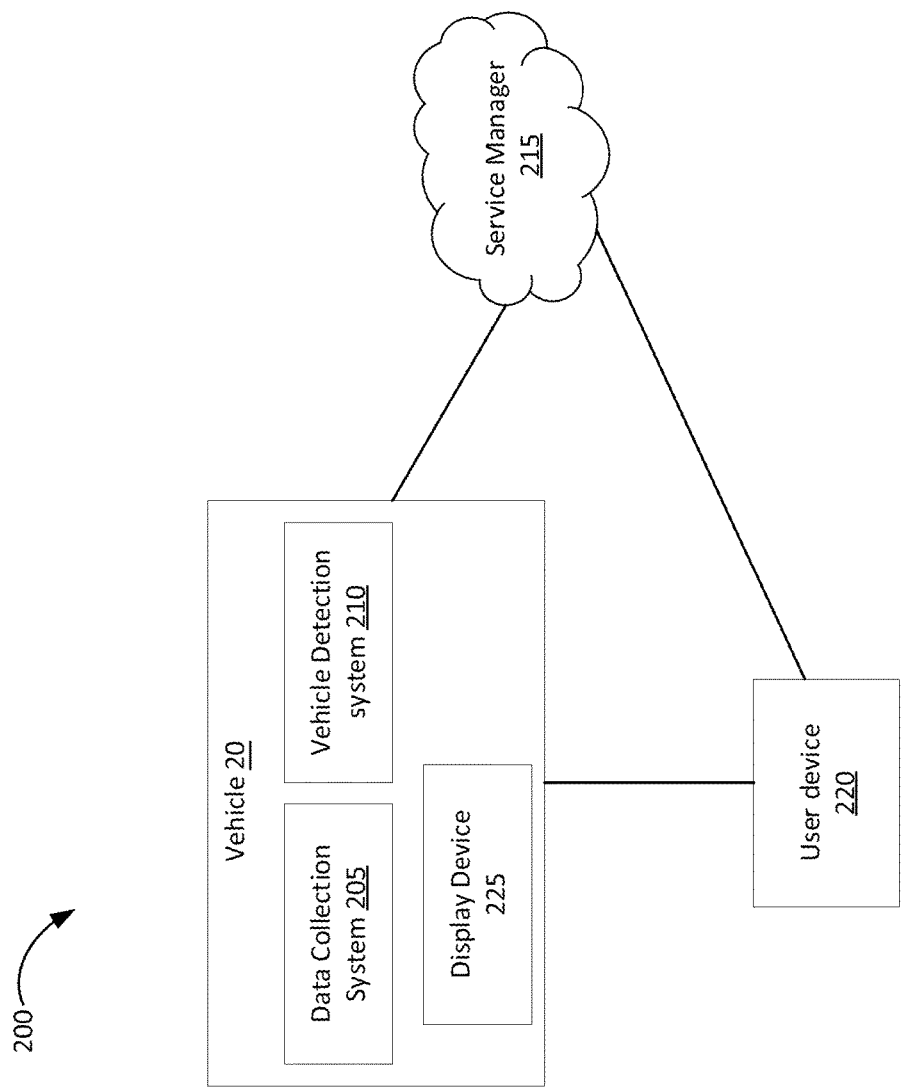
FIG. 2 is a block diagram of a vehicle monitoring system, according to an exemplary embodiment.

Referring now to FIG. 2. A monitoring system is shown as system 200. The system 200 includes one or more vehicles 20, a service manager 215 and one or more user devices 220. The vehicle 20 includes a data collection system 205 and a vehicle detection system 210. The vehicle 20 can interface with the user device 220 and/or the service manager 215. The vehicle 20 can provide information to the user device 220 and/or the service manager 215. Similarly, the vehicle 20 can receive information from the user device 220 and/or the service manager 215. The information can include information associated with the number of vehicle backups and/or other vehicle operations (e.g., emptying the collector 22, actuating the lift arms 140, and/or other vehicle or vehicle body operations). For example, the vehicle 20 can provide to the service manager 215 a report that indicates the number of vehicle backups that have occurred.

In some embodiments, the data collection system 205 can receive vehicle data from the vehicle detection system 210, the user device 220 and/or the service manager 215. In some embodiments, the data received can include telematics data. In some embodiments, the data collection system 205, the service manager 215 and the user device 220 can interface using a controller area network (CAN). The data collection system 205 can use the vehicle data to determine if a vehicle backup has occurred. For example, the data collection system 205 can receive a GPS coordinate of the vehicle as well as the drive mode of the vehicle (e.g., forward or reverse). The data collection system 205 can detect that the GPS coordinate of the vehicle has changed (e.g., the vehicle is moving) and that the vehicle is in reverse. The data collection system 205 can then determine that a vehicle backup has occurred. In some embodiments, the data collection system 205 can assign a location associated with the vehicle backup.

In some embodiments, the data collection system 205 can provide the information including the determined vehicle backup to the service manager 215 and/or the user device 220. A route traveled by the vehicle can also be included. In some embodiments, the service manager 215 and/or the data collection system 205 can analyze the route taken which included a vehicle backup. In some embodiments, the data collection system 205 and/or the service manager 215 can identify a route that can be taken to avoid repeating the vehicle backup.

In some embodiments, the information including the determined vehicle backup can be used for training drivers of a vehicle. For example, a driver can be trained to avoid situations that can result in the vehicle backup.

Figure 3:
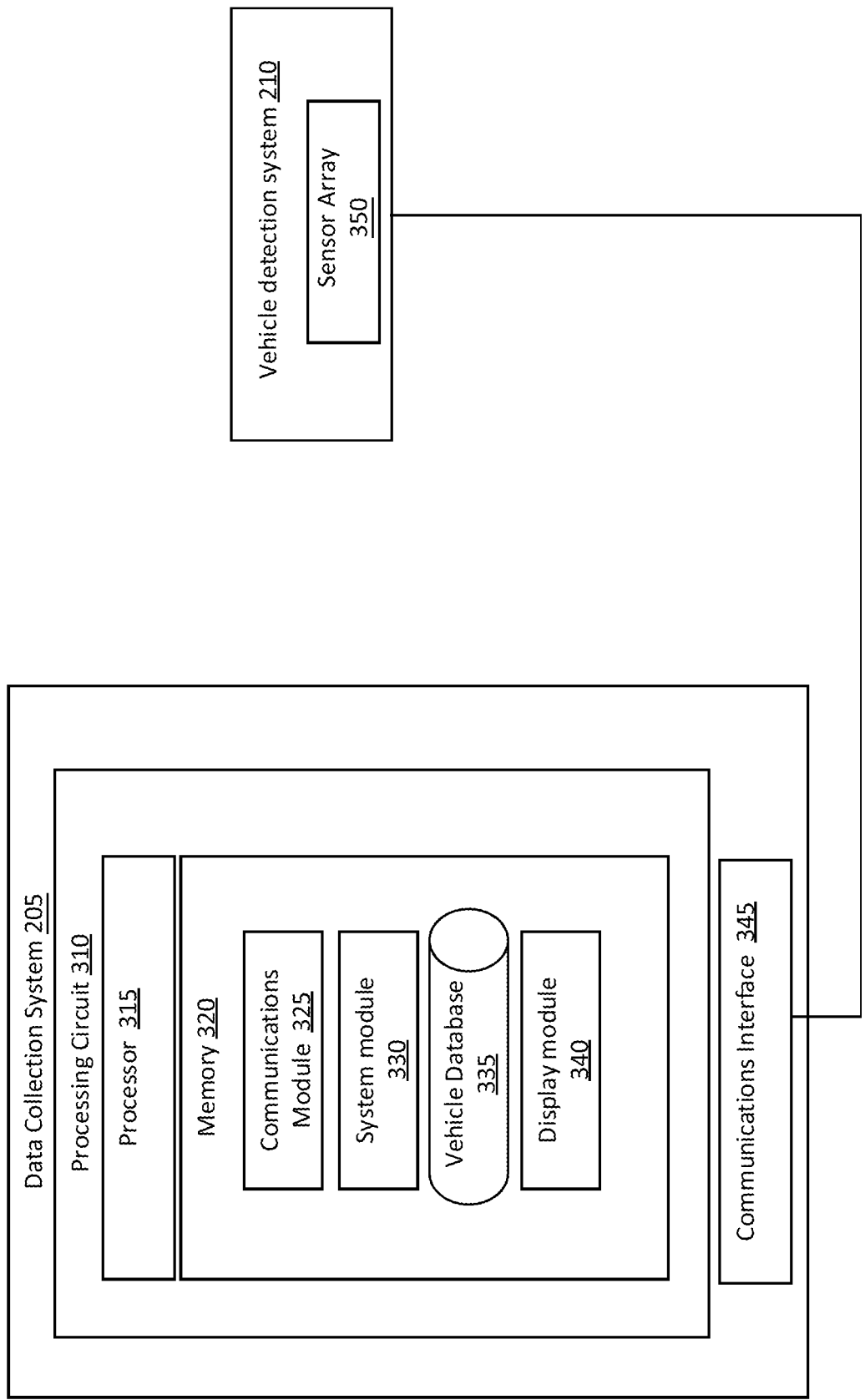
FIG. 3 is a block diagram of a data collection system and a vehicle detection system, according to an exemplary embodiment.

Referring now to FIG. 3. The data collection system 205 includes a processing circuit 310 and a communications interface 345. The processing circuit 310 can include a processor 315 and a memory 320. The memory 320 can include a communications module 325, a system module 330, a vehicle database 335 and a display module 340. The vehicle detection system 210 can include a sensor array 350. The vehicle detection system 210 can interface with the data collection system through the communications interface 345.

The processor 315 may be a general purpose or specific purpose processor, an application specific integrated circuit (ASIC), one or more field programmable gate arrays (FPGAs), a group of processing components, or other suitable processing components. The processor 315 may be configured to execute computer code or instructions stored in memory 206 or received from other computer readable media (e.g., CDROM, network storage, a remote server, etc.) to perform one or more of the processes described herein. Memory 320 may include one or more data storage devices (e.g., memory units, memory devices, computer-readable storage media, etc.) configured to store data, computer code, executable instructions, or other forms of computer-readable information. Memory 320 may include random access memory (RAM), read-only memory (ROM), hard drive storage, temporary storage, non-volatile memory, flash memory, optical memory, or any other suitable memory for storing software objects and/or computer instructions. Memory 320 may include database components, object code components, script components, or any other type of information structure for supporting the various activities and information structures described in the present disclosure. Memory 320 may be communicably connected to processor 315 via processing circuit 310 and may include computer code for executing (e.g., by processor 315, etc.) one or more of the processes described herein.

The memory 320 is described below as including various modules. While the exemplary embodiment shown in the figures shows each of the modules 325, 330, 335 and 340 as being separate from one another, it should be understood that, in various other embodiments, the memory may include more, less, or altogether different modules. For example, the structures and functions of one module may be performed by another module, or the activities of two modules may be combined such that they are performed by only a signal module.

The communications module 325 is configured to facilitate wireless communications with external computing systems and with other vehicles via communications interface 345 (e.g., a transceiver, etc.). Communications interface 345 may support any kind of wireless standard (e.g., 802.11 b/g/n, 802.11a, etc.) and may interface with any type of external computing system including wireless communication capability (e.g., cellular, Wi-Fi, etc.). Communications interface 345 may further facilitate wireless communications with an external global positioning system (GPS). Communications module 325 may be any type of capable module (e.g., a CL-T04 CANect® Wi-Fi Module manufactured by HED Inc., etc.) configured to support wireless communications with the external computing systems and other response vehicles. In one embodiment, the external computing systems communicate with the response vehicles via Wi-Fi. In other embodiments, the communications between the external computing systems and/or response vehicles may be supported via CDMA, GSM, or another cellular connection. In still other embodiments, another wireless protocol is utilized (e.g., Bluetooth, Zigbee, radio, etc.).

The system module 330 is structured to enable the processor 315 of the data collection system 205 to interface with vehicle detection system 210 of the vehicle 20. In the exemplary embodiment shown, the data collection system 205, via the system module 330, may generate a vehicle system report based on various sensor data points received from the vehicle detection system 210. The report may be generated by comparing the sensor data points received from the vehicle detection system 210. For example, a baseline sensor value for the vehicle detection system 210 may include an initial location of the vehicle 20. Thus, upon receipt of a sensor data point indicative of the location of the vehicle 20, the processor 315 may compare the received data point to the baseline value to determine if a vehicle backup has occurred. The generated report may indicate a total number of vehicle backups. As will be understood, there may be multiple baseline values with respect to each sensor of the vehicle detection system 210.

According to various embodiments, the system module 330 is structured to enable the processor 315 to modify the sample rate of the various sensors included in vehicle detection system 210. For example, the processor 315 may modify the sample rate of a particular sensor in response to detecting a particular operating state. In this sense, the processor 315 may cause each sensor to selectively record data points at predetermined intervals. For example, the processor 315 may determine an operating state of the vehicle (e.g., emergency response, pumping event, etc.) and adjust the predetermined intervals accordingly. For example, the processor 315 may cause the sample rate of the sensors to change depending on the operating state of the vehicle. According to various embodiments, the first rate corresponds with the sensors taking measurements at a more frequent rate (e.g., once every two minutes) than the second rate (e.g., once every thirty minutes).

The system module 330 may be structured to interface with various other modules to present the vehicle system report to an operator and/or other user. For example, the system module 330 may interface with the display module 340 to present the operator with the vehicle system report via the display device 225. The display module 340 may be configured to present the generated vehicle systems report on the display device 225 (e.g., via an interactive graphical user interface). Alternatively or additionally, the system module 330 may interface with the communications module 325 so as to format the generated vehicle system report into a webpage or the like that is viewable on a display device (e.g., user device 220) included in an external computing system and transmit the report data to the external computing system via the secure connection discussed above.

The vehicle database 335 may include, for example, telemetric data captured by the vehicle detection system 210. For example, the system module 330 may include a data logger or the like that stores any sensor data points received from the vehicle detection system 210. The vehicle database 335 may include a plurality of telemetry datasets, with each dataset corresponding to a different sensor device of the vehicle detection system 210. Each dataset may include a plurality of entries, with each entry including a sensor data point value and a time stamp. Alternatively or additionally, the vehicle database 335 may store the vehicle system reports generated via the system module 330.

The stored data may be removed from the vehicle database 335 once the data is uploaded to a remote cloud storage. For example, long-term storage of the telemetry data and other data may be done on a centralized server, and communications interface 345 may wirelessly connect with a remote server to transmit and store the data. The data includes a timestamp and vehicle identifier information to identify the data in remote server. In some embodiments, the service manager 215 can perform similar functionality to a remote server.

In one embodiment, the data is automatically updated periodically. The data may also be updated upon user request. A controller area network (CAN) controller, such as system module 330 or another module may be configured to monitor the data and to determine when a potential status of the vehicle 20 has changed based on the telemetry data changes (e.g., determine that a vehicle backup has occurred).

According to various embodiments, the processor may selectively transmit a subset of the data (e.g., data points from a specific subset of sensors) in response to an operating state of the vehicle being determined. For example, the data collection system may transmit data points from certain sensors (e.g., a water level sensor in the pump system) at a higher rate during a pumping event than other sensors (e.g., an engine output sensor). By reducing the total number of data points being transmitted, the strain on the communications interface 345 may be reduced.

Vehicle database 335 may be any type of database (e.g., a SQLite database, etc.), and modules 325, 330, 340 may query the database using any type of language or method via backend framework. The backend framework of data collection system 205 may support the activities of periodically updating and querying vehicle database 335, as well as providing web layer authentication (e.g., to authenticate devices that attempt to access data from vehicle database 335, etc.). The backend framework may further support the various security-related functionality of communications module 325.

Data collection system 205 may include, for example, a data transport protocol layer configured to facilitate the query of data from vehicle database 335 for use by the various modules of memory 320. In one embodiment, at least one of web sockets and AJAX polling is used to invoke queries via backend framework and provide the data to the frontend applications (e.g., the application layer, the modules, etc.), as they allow changes to the vehicle database 335 to be detected and pushed to the application layer. The use of web sockets and/or AJAX may be based on compatibility constraints and performance constraints with the external computing system accessing the data collection system 205. The application layer, or the frontend application, of data collection system 205 may be built using, for example, HTML5, CSS, and various Javascript libraries.

The sensor array 350 can include one or more sensors. The sensors can be at least one of a location sensor, a fuel sensor, an engine sensor, a drive mode sensor, a pump sensor, a collector sensor or a temperature sensor. The location sensors can detect location data. The sensor array 350 can provide the location data to the communications interface 345. The system module 330 can use the location data to determine whether a vehicle backup has occurred. In some embodiments, the system module 330 can use the location data to associate the vehicle with a position on a map. In some embodiments, the system module 330 may utilize the location data to generate a route traveled by the vehicle 20. The system module 330 can associate a route with a total number of vehicle backups. In some embodiments, the system module 330 can compare the routes and the vehicle backups associated with the route to a vehicle backup metric. In some embodiments, the vehicle backup metric can be a predetermined number of vehicle backups. The system module 330 can use the vehicle backup metric to identify routes that have a total number of vehicle backups above, below and/or within the vehicle backup metric.

The fuel sensors can detect data that can be used by the system module 330 to determine fuel usage. The engine sensor can detect data that can be used by the system module 330 to determine an engine runtime metric. The drive mode sensor can detect data that can be used by the system module 330 to determine a drive mode of the vehicle. The pump sensor can detect data that can be used by the system module 330 to determine a pump metric. The pump metric can include a number of pump hours. The collector sensor can detect data that can be used by the system module 330 to determine a collector metric. The collector metric can include a number of waste collection stops, a number of arm dumps, a number of eject cycles and/or a number of arm dumps. The temperature sensor can detect data that can be used by the system module 330 to determine temperature throughout various components of the vehicle.

In some embodiments, the service manager 215 can perform similar functionality to the data collection system 205 and/or the vehicle detection system 210. For example, the data collected by the vehicle detection system 210 can be provided to the service manager 215. The service manager 215 can use the data to determine whether a vehicle backup has occurred. The service manager 215 can associate the vehicle backup with a route traveled by the vehicle.

In some embodiments, the data collection system 205 and/or the vehicle detection system 210 can perform similar functionality to a telematics control unit (TCU) connected to a Controller Area Network bus which can interface with a remote data center. In some embodiments, the data collected by the data collection system 205 and/or the vehicle detection system 210 can be provided to the service manager 215. (e.g., remote data center) The service manager 215 can analyze the data provided by the data collection system 205 and/or the vehicle detection system. For example, the data provided to the service manager 215 can include location data and drive mode data. The service manager 215 can determine, using the location data and the drive mode data, that a vehicle backup occurred. In some embodiments, the service manager 215 can associate the vehicle backup with one or more routes. In some embodiments, the service manager 215 can analyze one or more vehicle backups and determine a backup factor associated with a vehicle backup. For example, a backup factor can be at least one of a road closure, a driver action, a weather occurrence or a vehicle failure. In some embodiments, the service manager 215 can analyze the backup factors associated with the vehicle backups to determine if a coaching opportunity exists. For example, driver 1 and driver 2 travel on the same route and perform the same vehicle tasks. However, driver 1 performed more vehicle backups compared to the vehicle backups performed by driver 2. In some embodiments, the service manager 215 can recommend that driver 1 receive additional coaching.

In some embodiments, the service manager 215 can compare vehicle backups associated with a certain route to determine if the vehicle backups change amongst days of the week. For example, on a Tuesday and/or a Thursday a driver travels on the same route and performs the same vehicle tasks. However, the vehicle backups performed on one of the days was higher than the other day. In some embodiments, the service manager 215 can determine that on certain days the vehicle backups can be higher.

In some embodiments, the service manager 215 can provide the information associated with a vehicle backup to a display device. The display device can provide a user interface to a user. The user can view the information associated with the vehicle backups. For example, the location of the vehicle backups can be placed on a map. The map can include an interactive satellite view. The user can view roads, objects (e.g., trees, buildings, etc.) and/or the locations of the vehicle backups. In some embodiments, the user interface can provide a graphical representation of the information associated with the vehicle backups. For example, a graph that includes one or more days and the number of vehicle backups associated with a certain day. In some embodiments, the user can select a date range of vehicle information. The user interface can display the information associated with the vehicle backups included within the selected date range. In some embodiments, the service manager 215 can determine that the number of vehicle backups associated with a certain route is not within the vehicle backup metric. In some embodiments, the service manager 215 can display an alert on the user interface. In some embodiments, the user can select a prompt associated with the alert to view the information associated with the alert. In some embodiments, the user can provide an indication to the service manager 215. The indication can be an indication that a driver associated with certain vehicle backups has been selected to undergo vehicle backup coaching. The service manager 215 can provide the indication to the driver associated with the certain vehicle backups. In some embodiments, the service manager 215 can schedule and track the vehicle backup coaching associated with the driver.

Figure 4:
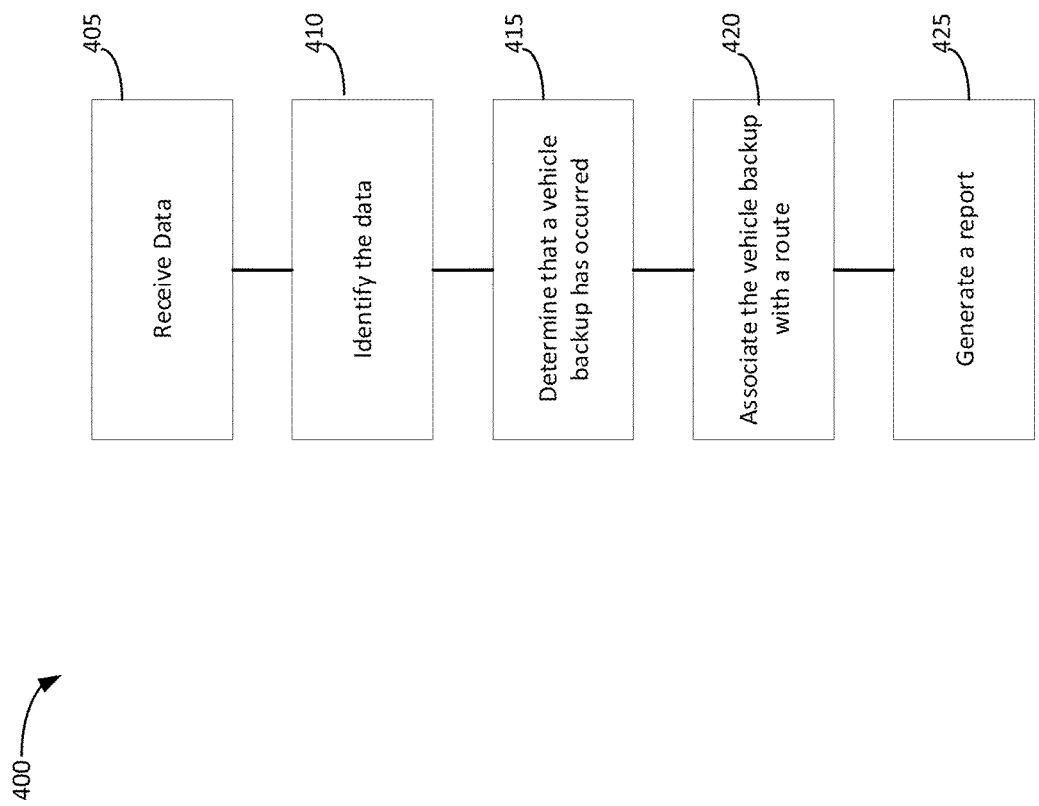
FIG. 4 is block diagram of a backup detection and monitoring process, according to an exemplary embodiment.

Referring now to FIG. 4, a process 400 is shown. In some embodiments, the data collection system 205, the vehicle detection system 210 and/or the service manager 215 can perform the process 400. At step 405, data is received. For example, the data received can include data that is collected by the sensor array 350. The data can include location data. At step 410, the data can be identified. The system module 330 can identify that the data is location data. For example, the system module 330 can determine that the data includes information about the location of a vehicle. For example, the data can include GPS coordinates.

At step 415, the location data can be used to determine that a vehicle backup has occurred. The system module 330 can use the location data to identify the location of the vehicle. For example, the system module 330 can determine that the vehicle is at a dead end (e.g., an alley that connects directly to a building). The system module 330 can use the location data and the drive mode data to determine whether a vehicle backup has occurred. For example, the system module 330 can use the location data to determine that the vehicle is moving and can use the drive mode data to determine the vehicle is in reverse.

At step 420, the vehicle backup can be associated with a route. The system module 330 can use the location data to determine a route traveled by the vehicle. The system module 330 can associate a vehicle backup with the route. For example, as the system module 330 determines that a vehicle backup has occurred the system module 330 can assign a location to the vehicle backup. The system module 330 can use the location assigned to the vehicle backup to associate the vehicle backup with the route (e.g., the location is included in the route).

At step 425, a report is generated. The report can include a vehicle travel route, a number of vehicle backups performed during the vehicle travel route, a location associated with a vehicle backup, a number of vehicle tasks, the location associated with a vehicle task and a comparison of the number of vehicle backups to the vehicle backup metric.

In some embodiments, the report can be provided to a user. The report can be displayed using a user interface. For example, the communications module 325 can interface with the user device 220. The communications module 325 can provide the report to the user device 220 and the user device 220 can display the report using a user interface associated with the user device 220. A user associated with the user device 220 can view the information associated with the report. For example, the user can view the total number of vehicle backups associated with a route. In some embodiments, the user can provide an indication to the data collection system 205. The indication can be an indication to recommend a route that can be traveled with fewer vehicle backups. For example, the system module 330 can identify the report associated with the indication. The system module 330 can determine the number of vehicle backups associated with the report, the locations of the vehicle backups, the number of vehicle tasks and the location of the vehicle tasks. The system module 330 can recommend a route that can be traveled which includes the vehicle tasks and a number of vehicle backups that is less than the previous route.

Figure 5:
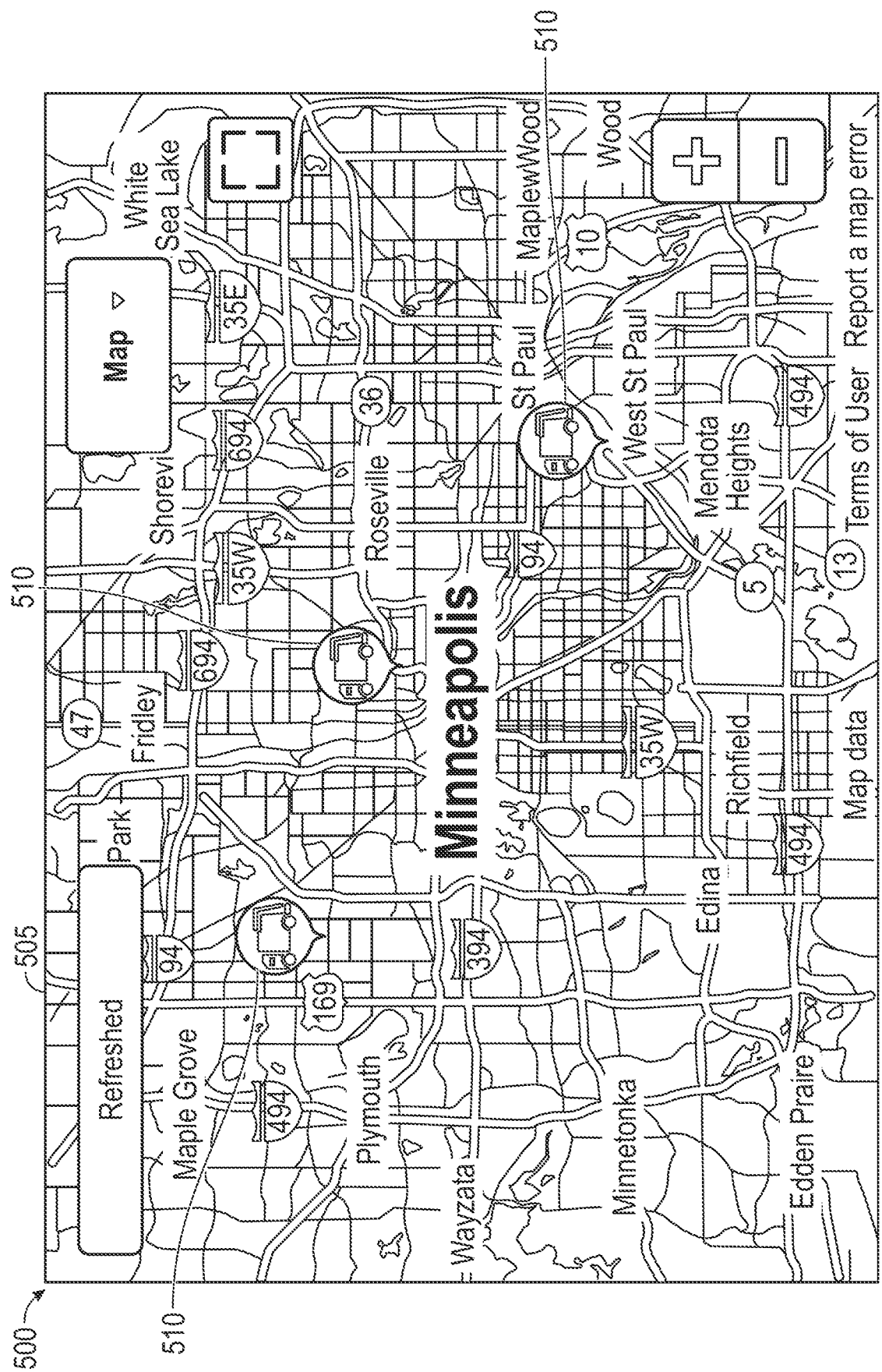
FIG. 5 is a user interface displaying a map, according to an exemplary embodiment.

Referring now to FIG. 5. A user interface 500 is displayed. The user interface 500 includes a map 505. The map 505 can include a visual representation of a vehicle (e.g., a visual representation of the vehicle 20). In some embodiments, the visual representation is a vehicle icon 510. In some embodiments, the location of the vehicle icon 510, as shown in the user interface 500, can be associated with a location of at least one of a vehicle backup, a vehicle task or a vehicle stop. In some embodiments, the data collection system 205 can generate the information displayed in FIG. 5. In some embodiments, the user interface 500 can be provided to a display device (e.g., display device 225 or user device 220). In some embodiments, the information displayed in FIG. 5 can be included in a vehicle system report.

Figure 6:
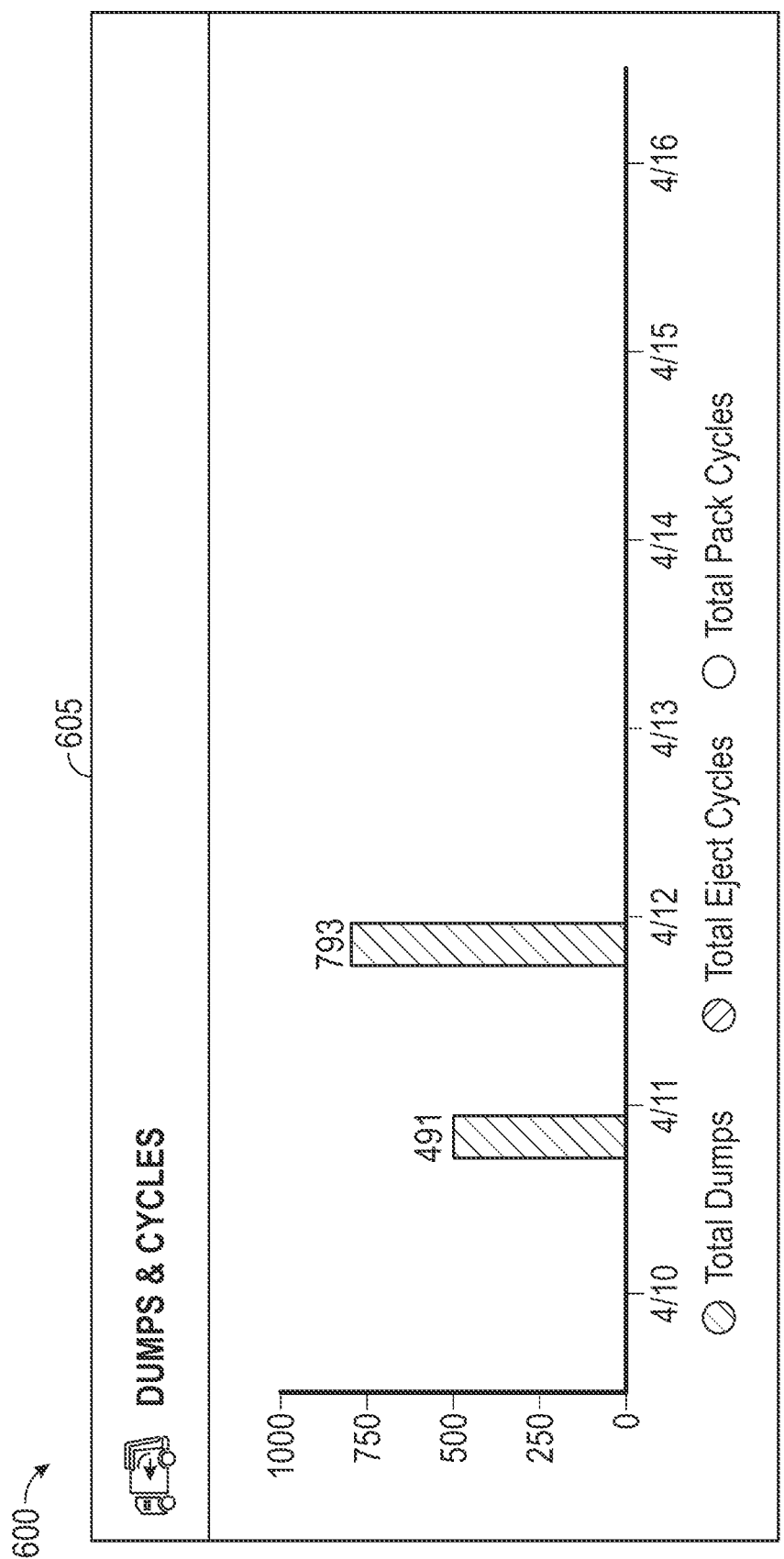
FIG. 6 is a user interface displaying vehicle information, according to an exemplary embodiment.

Referring now to FIG. 6. A user interface 600 is displayed. The user interface 600 includes a graphical representation 605 of vehicle tasks that have been performed by a vehicle. For example, the tasks can include total dumps, total eject cycles and total pack cycles. In some embodiments, the data collection system 205 can generate the information displayed in FIG. 6. In some embodiments, the user interface 600 can be provided to a display device (e.g., display device 225 or user device 220). In some embodiments, the information displayed in FIG. 6 can be included in a vehicle system report. In some embodiments, the FIG. 5 user interface and the FIG. 6 user interface can be included within a single user interface (e.g., the user interfaces are combined).

Figure 7:
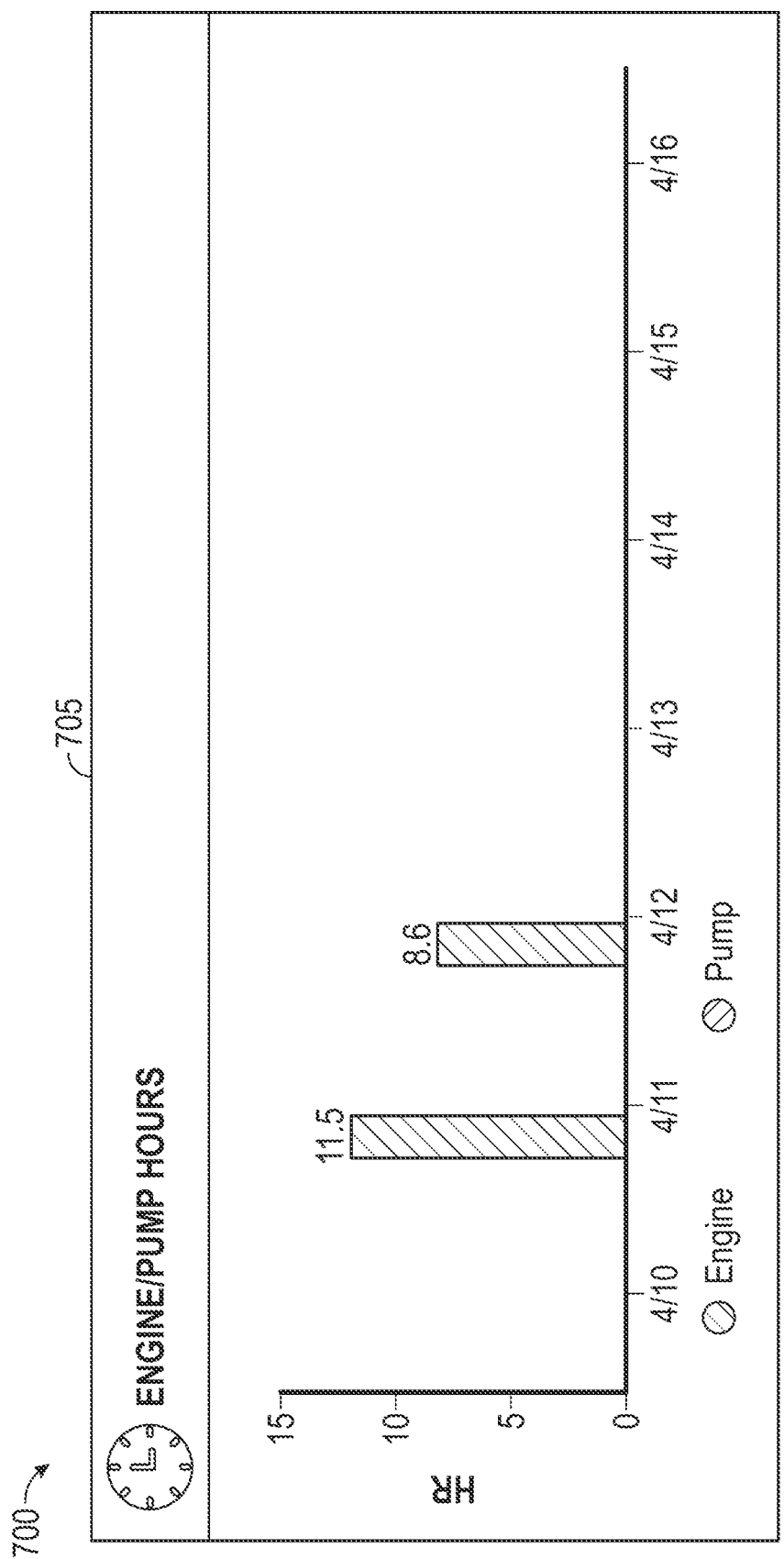
FIG. 7 is a user interface displaying vehicle information, according to an exemplary embodiment.

Referring now to FIG. 7. A user interface 700 is displayed. The user interface 700 includes a graphical representation 705 of vehicle information. For example, a total amount of engine hours and pump hours associated with a particular day. In some embodiments, the data collection system 205 can generate the information displayed in FIG. 7. In some embodiments, the user interface 700 can be provided to a display device (e.g., display device 225 or user device 220). In some embodiments, the information displayed, via the user interface 700, can be included in a vehicle system report. In some embodiments, the user interface 500, the user interface 600, and the user interface 700 can be included within a single user interface (e.g., the user interfaces are combined).

Figure 8:
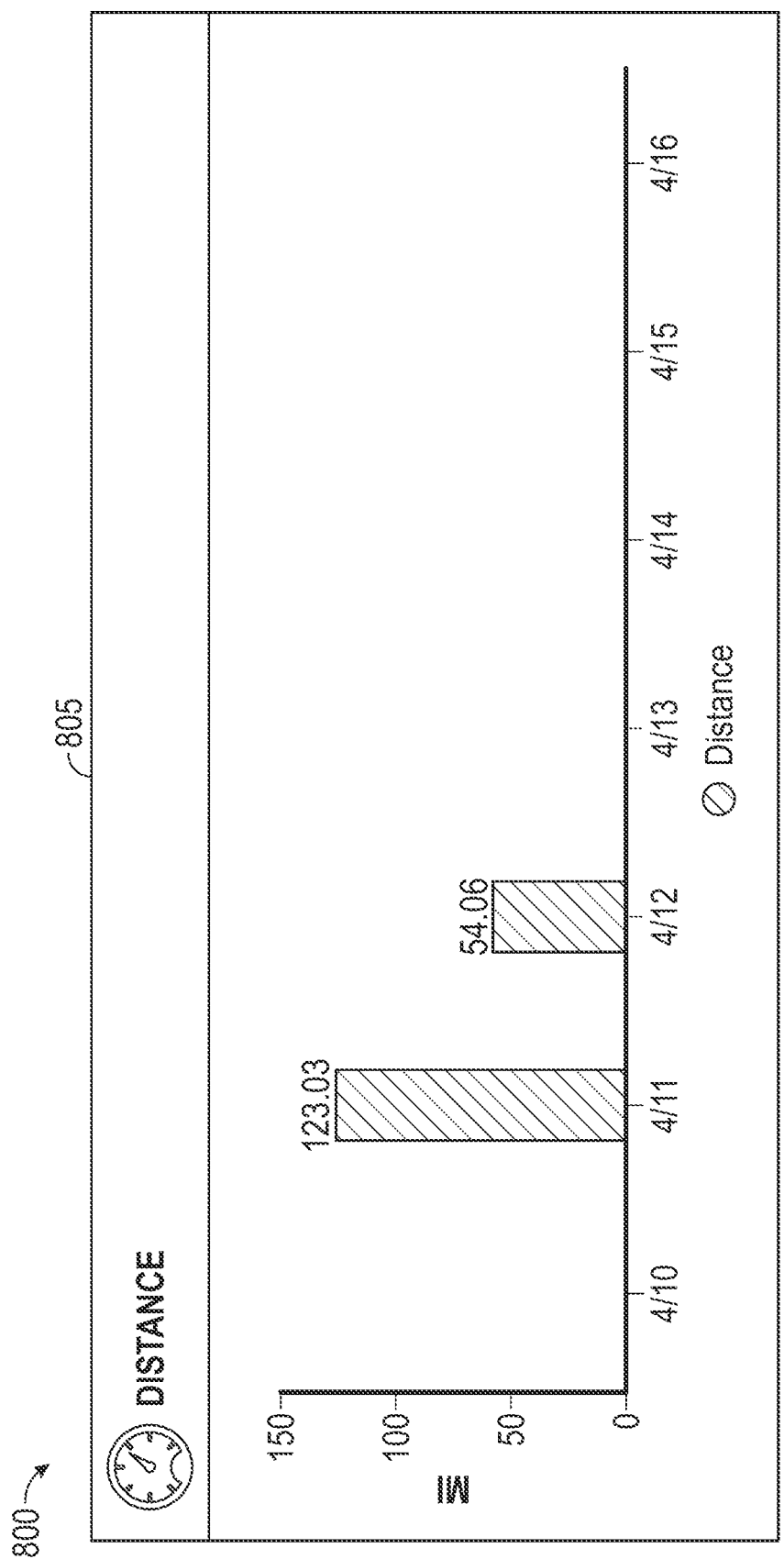
FIG. 8 is a user interface displaying vehicle information, according to an exemplary embodiment.

Referring now to FIG. 8. A user interface 800 is displayed. The user interface 800 includes a graphical representation 805 of vehicle information. For example, a distance traveled by a vehicle. In some embodiments, the data collection system 205 can generate the information displayed in FIG. 8. In some embodiments, the user interface 800 can be provided to a display device (e.g., display device 225 or user device 220). In some embodiments, the information displayed in FIG. 8 can be included in a vehicle system report. In some embodiments, the user interface 500, the user interface 600, the user interface 700, and the user interface 800 can be included within a single user interface (e.g., the user interfaces are combined).

Figure 9:
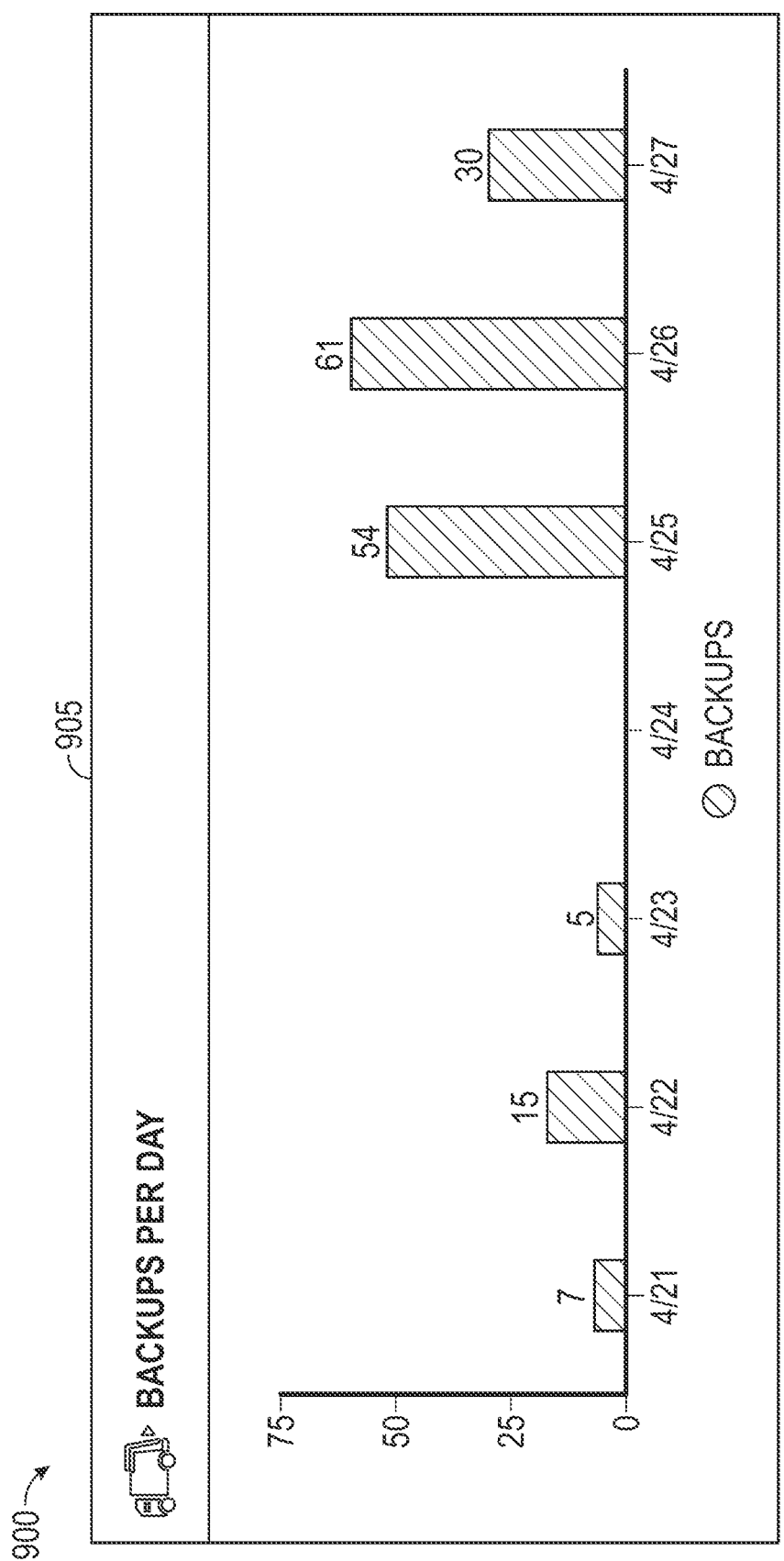
FIG. 9 is a user interface displaying vehicle information, according to an exemplary embodiment.

Referring now to FIG. 9. A user interface 900 is displayed. The user interface 900 includes a graphical representation 905 of vehicle information. For example, an amount a vehicle backups performed by a vehicle. In some embodiments, the data collection system 205 can generate the information displayed in FIG. 9. In some embodiments, the user interface 900 can be provided to a display device (e.g., display device 225 or user device 220). In some embodiments, the information displayed in FIG. 9 can be included in a vehicle system report. In some embodiments, the user interface 500, the user interface 600, the user interface 700, the user interface 800, and the user interface 900 can be included within a single user interface (e.g., the user interfaces are combined).

Figure 10:
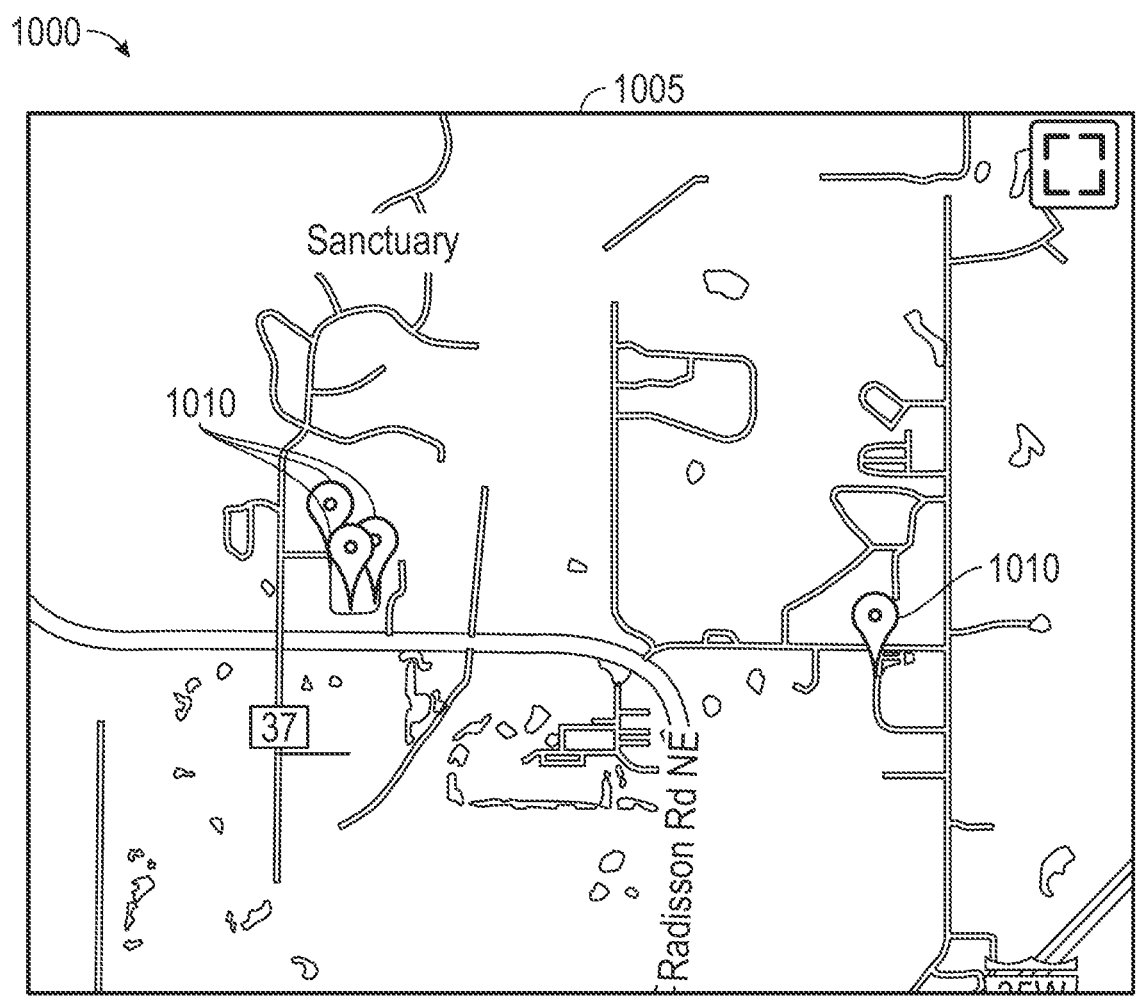
FIG. 10 is a user interface displaying a map, according to an exemplary embodiment.

Referring now to FIG. 10. A user interface 1000 is displayed. The user interface 1000 includes a map 1005. The map 1005 can include a visual representation of vehicle tasks (e.g., vehicle backups, vehicle maneuvers, collections, dump cycles, etc.). In some embodiments, the visual representation is a pin 1010. In some embodiments, the location of the pins 1010 can be associated with a location that at least one of a vehicle backup, a vehicle task or a vehicle stop occurred. In some embodiments, the data collection system 205 can generate the information displayed in FIG. 10. In some embodiments, the user interface 1000 can be provided to a display device (e.g., display device 225 or user device 220). In some embodiments, the information displayed in FIG. 10 can be included in a vehicle system report. In some embodiments, the user interface 500, the user interface 600, the user interface 700, the user interface 800, the user interface 900, and the user interface 1000 can be included within a single user interface (e.g., the user interfaces are combined).

Figure 11:
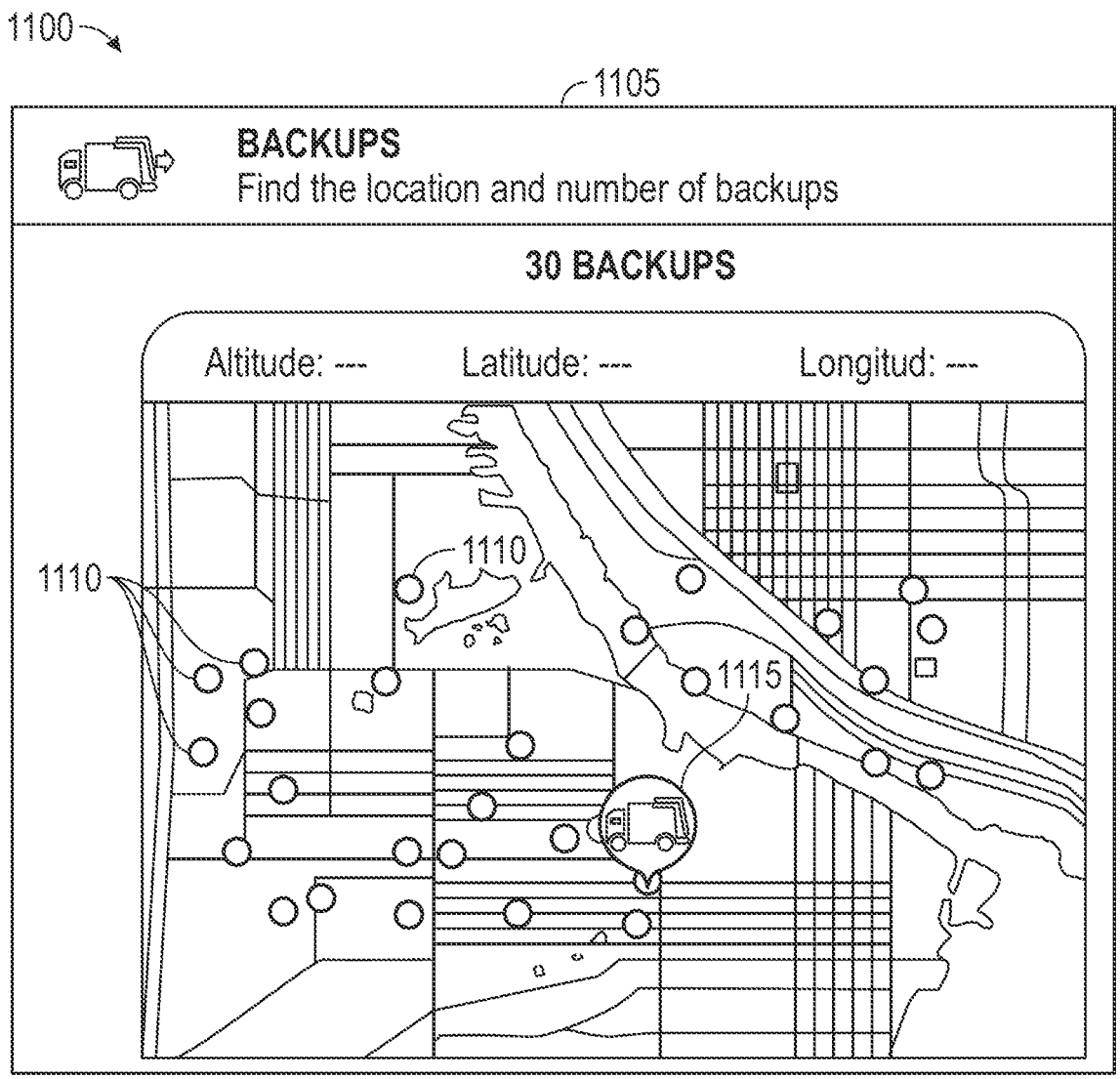
FIG. 11 is a user interface displaying a map, according to an exemplary embodiment.

Referring now to FIG. 11. A user interface 1100 is displayed. The user interface 1100 includes a map 1105. The map 1105 includes a visual representation of locations associated with vehicle backups. In some embodiments, the locations can be provided by selecting icons 1110 or icons 1115 displayed on the user interface 1100. The icons 1110 can represent a single vehicle task (e.g., a single vehicle backup) and the icons 1115 can represent a vehicle (e.g., the vehicle 20) associated with the vehicle tasks. Selecting the icons 1110 or the icons 1115 can result in information similar to that of the user interfaces described herein being presented, displayed or otherwise provided. In some embodiments, the data collection system 205 can generate the information displayed in FIG. 11. In some embodiments, the user interface 1100 can be provided to a display device (e.g., display device 225 or user device 220). In some embodiments, the information displayed in FIG. 11 can be included in a vehicle system report. In some embodiments, the information displayed in FIG. 10 can be included in a vehicle system report. In some embodiments, the user interface 500, the user interface 600, the user interface 700, the user interface 800, the user interface 900, the user interface 1000, and the user interface 1100 can be included within a single user interface (e.g., the user interfaces are combined).

Figure 12:
FIG. 12 is a user interface displaying vehicle information, according to an exemplary embodiment.

Referring now to FIG. 12. A user interface 1200 is displayed. The user interface 1200 includes information associated with a vehicle. For example, a total fuel icon 1205, an idle fuel icon 1210, an idle time icon 1215, an engine time icon 1220, a miles icon 1225, an arm dumps icon 1230, an eject cycles icon 1235, a packer cycles icon 1240, a pump hours icon 1245 and a temperature associated with hydraulic oil icon 1250. In some embodiments, the data collection system 205 can generate the information displayed in FIG. 12. In some embodiments, the user interface 1200 can be provided to a display device (e.g., display device 225 or user device 220). In some embodiments, the information displayed in FIG. 10 can be included in a vehicle system report. In some embodiments, the user interface 500, the user interface 600, the user interface 700, the user interface 800, the user interface 900, the user interface 1000, the user interface 1100, and the user interface 1200 can be included within a single user interface (e.g., the user interfaces are combined).

Referring now to FIG. 13. A user interface 1300 is displayed. The user interface 1300 includes information associated with a vehicle. The user interface 1300 includes a date/time icon 1305, a speed icon 1310, a heading icon 1315, and an elevation icon 1320. The icons can illustrate an association between information. For example, the speed icon 1310 can illustrate one or more vehicle speeds, the heading icon 1315 can illustrate a vehicle heading associated with the vehicle speeds, the elevation icon 1320 can illustrate an elevation and the date/time icon 1305 can illustrate a time slot. In some embodiments, the data collection system 205 can generate the information displayed in FIG. 13. In some embodiments, the user interface 1300 can be provided to a display device (e.g., display device 225 or user device 220). In some embodiments, the information displayed in FIG. 13 can be included in a vehicle system report. In some embodiments, the information displayed in FIG. 10 can be included in a vehicle system report. In some embodiments, the user interface 500, the user interface 600, the user interface 700, the user interface 800, the user interface 900, the user interface 1000, the user interface 1100, the user interface 1200, and the user interface 1300 can be included within a single user interface (e.g., the user interfaces are combined).

Figure 14:
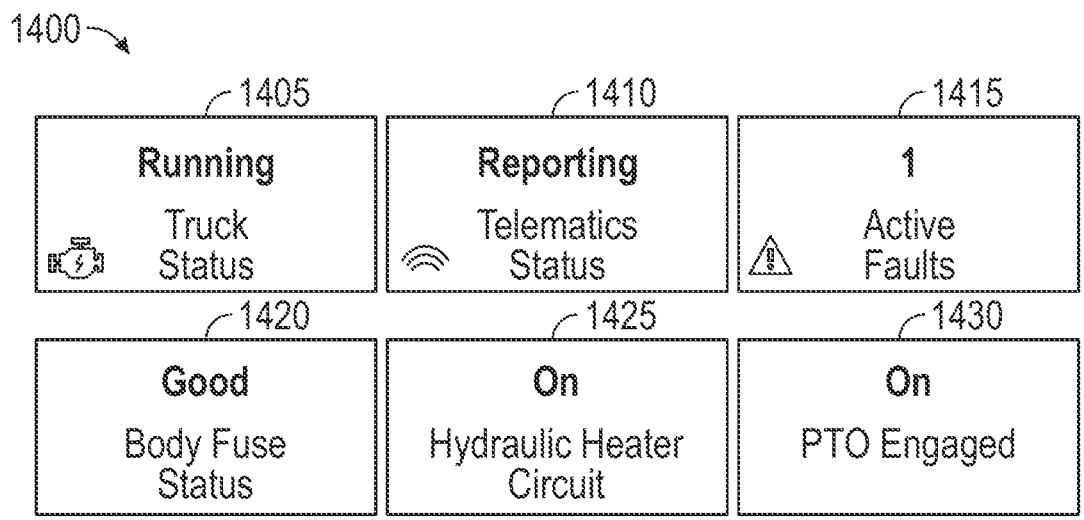
FIG. 14 is a user interface displaying vehicle information, according to an exemplary embodiment.

Referring now to FIG. 14. A user interface 1400 is displayed. The user interface 1400 includes information associated with a vehicle. For example, a vehicle status icon 1405, a telematics status icon 1410, a number of faults icon 1415, a body fuse status icon 1420, a hydraulic heater circuit status 1425, and a PTO engaged status icon 1430. In some embodiments, the data collection system 205 can generate the information displayed in FIG. 14. In some embodiments, the user interface 1400 can be provided to a display device (e.g., display device 225 or user device 220). In some embodiments, the information displayed in FIG. 14 can be included in a vehicle system report. In some embodiments, the user interface 500, the user interface 600, the user interface 700, the user interface 800, the user interface 900, the user interface 1000, the user interface 1100, the user interface 1200, the user interface 1300, and the user interface 1400 can be included within a single user interface (e.g., the user interfaces are combined).

Figure 15:
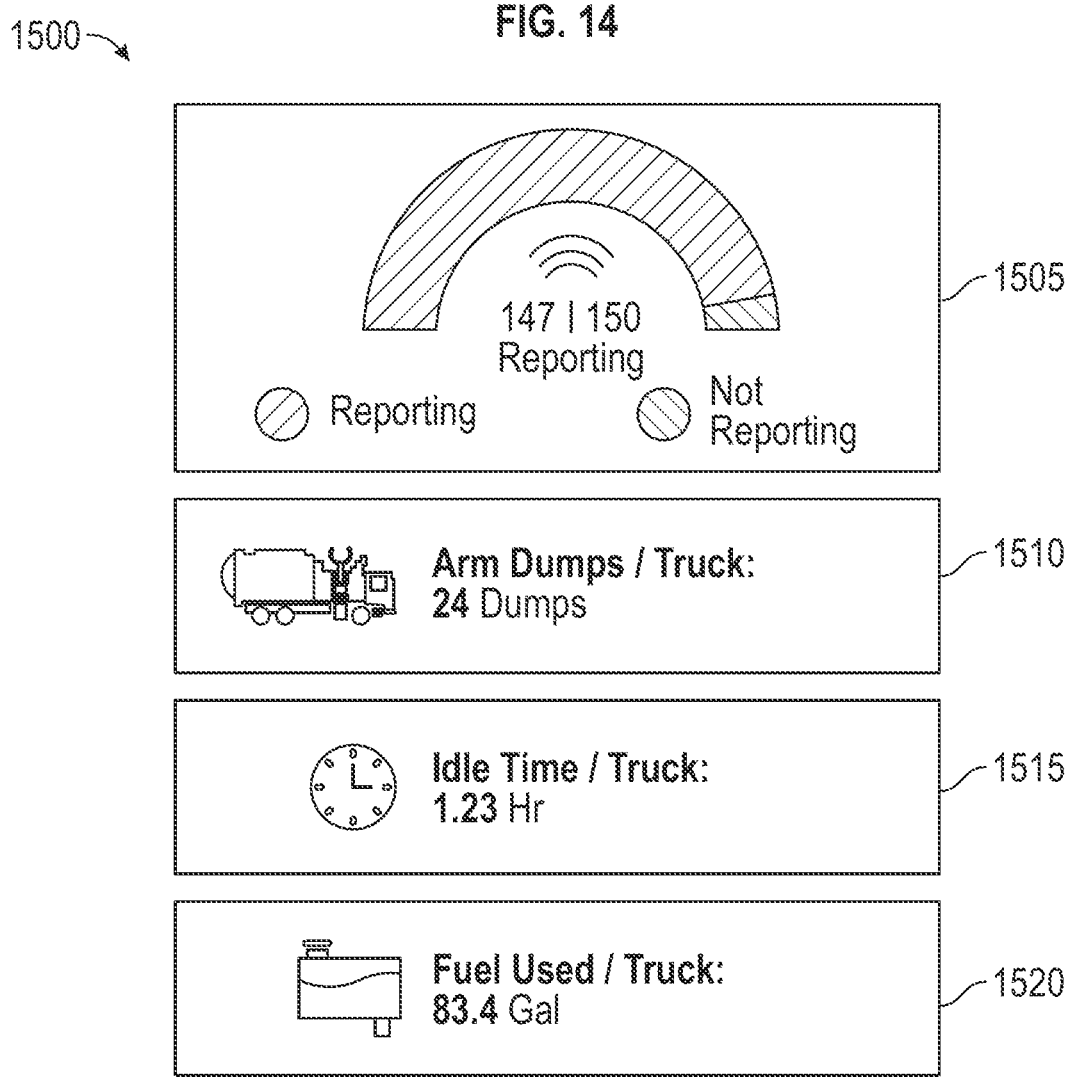
FIG. 15 is a user interface displaying vehicle information, according to an exemplary embodiment.

Referring now to FIG. 15. A user interface 1500 is displayed. The user interface 1500 includes information associated with a vehicle. For example, a telematics status icon 1505 including a number of reported telematics information and a number of not reporting telematics information. A number of arm dumps icon 1510, an idle amount time icon 1515 and an amount of fuel used icon 1520. In some embodiments, the data collection system 205 can generate the information displayed in FIG. 15. In some embodiments, the user interface 1500 can be provided to a display device (e.g., display device 225 or user device 220). In some embodiments, the information displayed in FIG. 15 can be included in a vehicle system report. In some embodiments, the user interface 500, the user interface 600, the user interface 700, the user interface 800, the user interface 900, the user interface 1000, the user interface 1100, the user interface 1200, the user interface 1300, the user interface 1400, and the user interface 1500 can be included within a single user interface (e.g., the user interfaces are combined).

Figure 16:
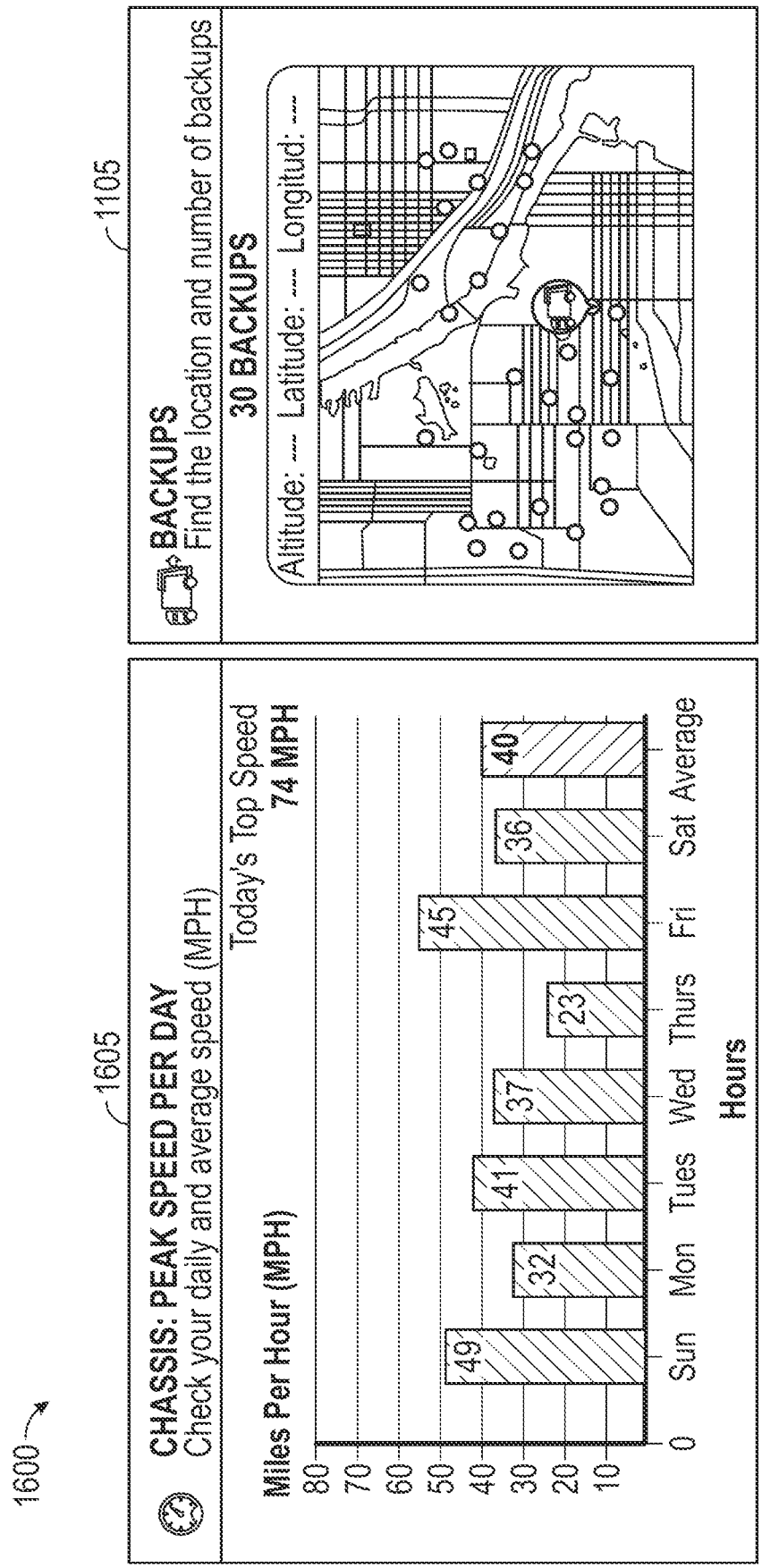
FIG. 16 is a user interface displaying vehicle information, according to an exemplary embodiment.

Referring now to FIG. 16. A user interface 1600 is displayed. The user interface 1600 includes a graphical representation 1605 of vehicle speed information and the information included in FIG. 11 (e.g., the map 1105). In some embodiments, the information can be information that is not included in FIG.11. For example, the map 1105 can be replaced with the information illustrated in FIG. 10. In some embodiments, the data collection system 205 can generate the information displayed in FIG. 16. In some embodiments, the user interface 1600 can be provided to a display device (e.g., display device 225 or user device 220). In some embodiments, the information displayed in FIG. 16 can be included in a vehicle system report. In some embodiments, the user interface 500, the user interface 600, the user interface 700, the user interface 800, the user interface 900, the user interface 1000, the user interface 1100, the user interface 1200, the user interface 1300, the user interface 1400, the user interface 1500, and the user interface 1600 can be included within a single user interface (e.g., the user interfaces are combined).

Referring now to FIG. 17. A user interface 1700 is displayed. The user interface 1700 includes a list 1705 of incomplete pickups. The list 1705 can include downtime events 1710, GPS locations 1715, dates 1720, and acknowledgments 1725. For example, the list 1705 can include one or more events (e.g., blocked can, can missing, etc.), a location associated with the events, a date and time associated with the event and if the incomplete pickup has been acknowledged. In some embodiments, the data collection system 205 can generate the information displayed in FIG. 17. In some embodiments, the user interface 1700 can be provided to a display device (e.g., display device 225 or user device 220). In some embodiments, the information displayed in FIG. 17 can be included in a vehicle system report. In some embodiments, the information displayed in FIG. 16 can be included in a vehicle system report. In some embodiments, the user interface 500, the user interface 600, the user interface 700, the user interface 800, the user interface 900, the user interface 1000, the user interface 1100, the user interface 1200, the user interface 1300, the user interface 1400, the user interface 1500, the user interface 1600, and the user interface 1700 can be included within a single user interface (e.g., the user interfaces are combined).

Figure 18:
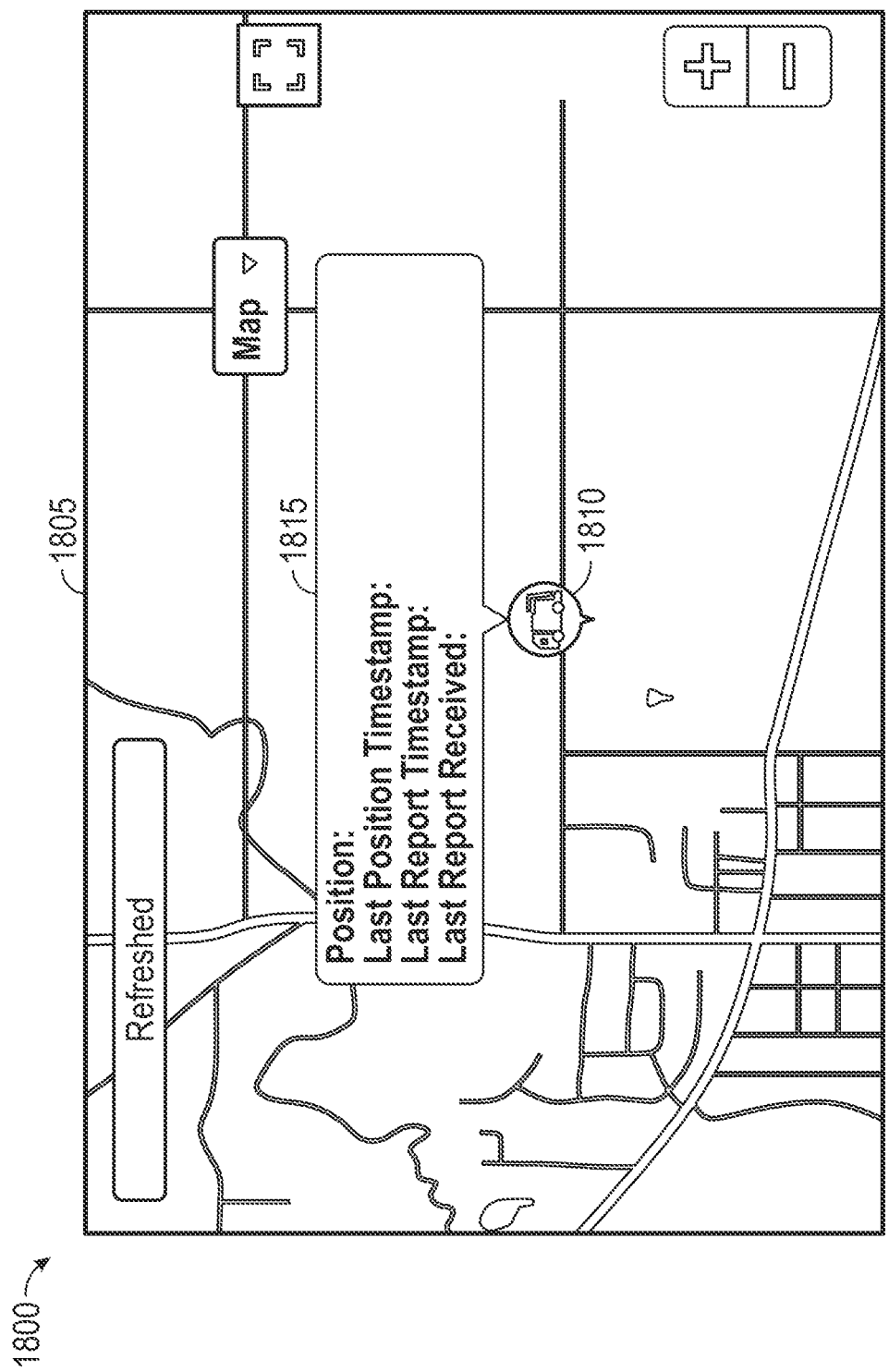
FIG. 18 is a user interface displaying a map, according to an exemplary embodiment.

Referring now to FIG. 18. A user interface 1800 is displayed. The user interface 1800 includes a map 1805. The map 1805 can include a visual representation of a vehicle. In some embodiments, the visual representation is a vehicle icon 1810. In some embodiments, a user can be provided additional information by selecting the vehicle icon. For example, a text box 1815 can include a location of the vehicle, a last position timestamp, a last reported timestamp and a last report received date. In some embodiments, the data collection system 205 can generate the information displayed in FIG. 18. In some embodiments, the user interface 1800 can be provided to a display device (e.g., display device 225 or user device 220). In some embodiments, the information displayed in FIG. 18 can be included in a vehicle system report. In some embodiments, the user interface 500, the user interface 600, the user interface 700, the user interface 800, the user interface 900, the user interface 1000, the user interface 1100, the user interface 1200, the user interface 1300, the user interface 1400, the user interface 1500, the user interface 1600, the user interface 1700, and the user interface 1800 can be included within a single user interface (e.g., the user interfaces are combined).

Figure 19:
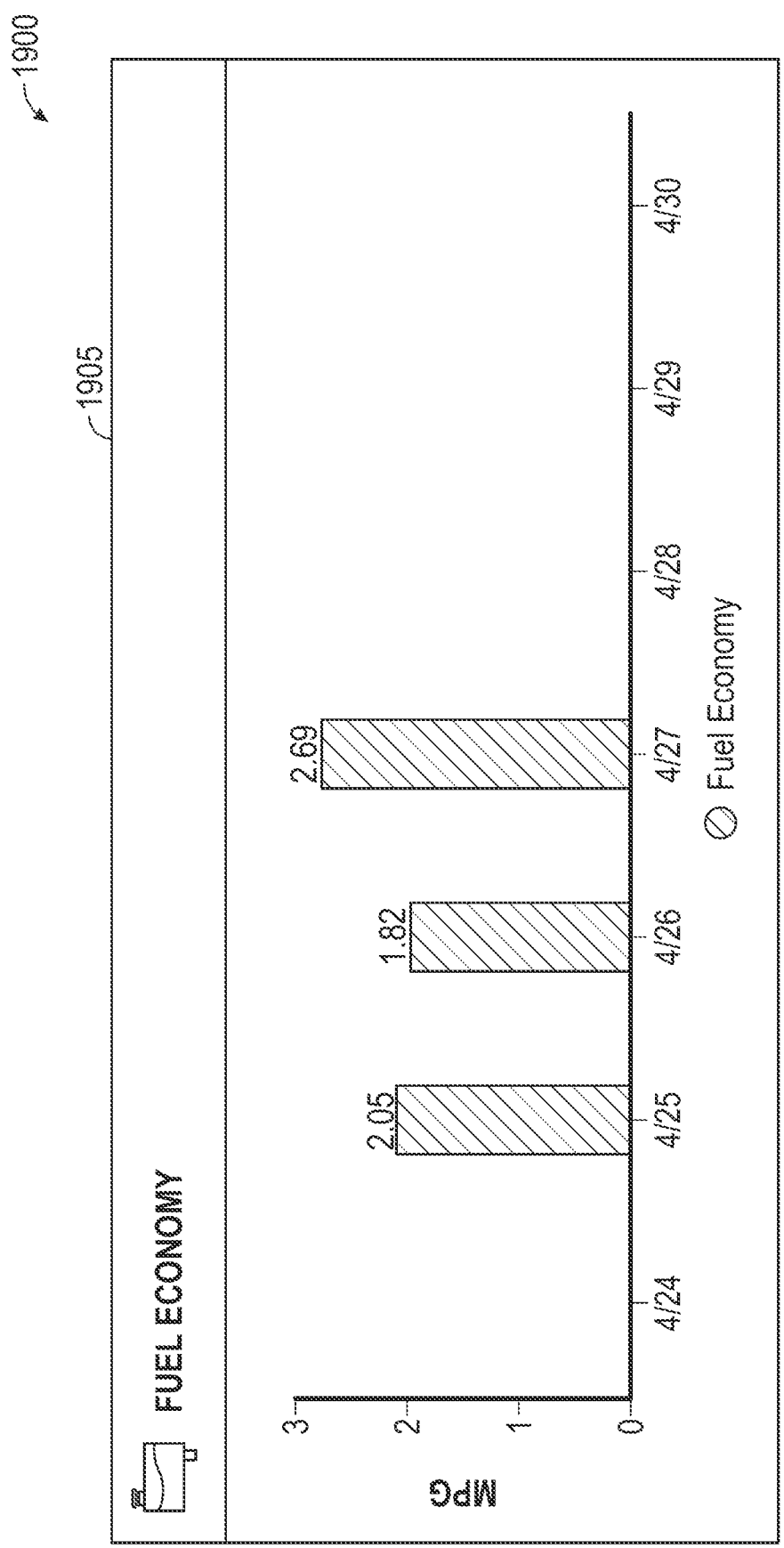
FIG. 19 is a user interface displaying vehicle information, according to an exemplary embodiment.

Referring now to FIG. 19. A user interface 1900 is displayed. The user interface 1900 includes a graphical representation 1905 of information associated with a vehicle. For example, a vehicle fuel economy associated with a date. In some embodiments, the data collection system 205 can generate the information displayed in FIG. 19. In some embodiments, the user interface 1900 can be provided to a display device (e.g., display device 225 or user device 220). In some embodiments, the information displayed in FIG. 19 can be included in a vehicle system report. In some embodiments, the user interface 500, the user interface 600, the user interface 700, the user interface 800, the user interface 900, the user interface 1000, the user interface 1100, the user interface 1200, the user interface 1300, the user interface 1400, the user interface 1500, the user interface 1600, the user interface 1700, the user interface 1800, and the user interface 1900 can be included within a single user interface (e.g., the user interfaces are combined).

Figure 20:
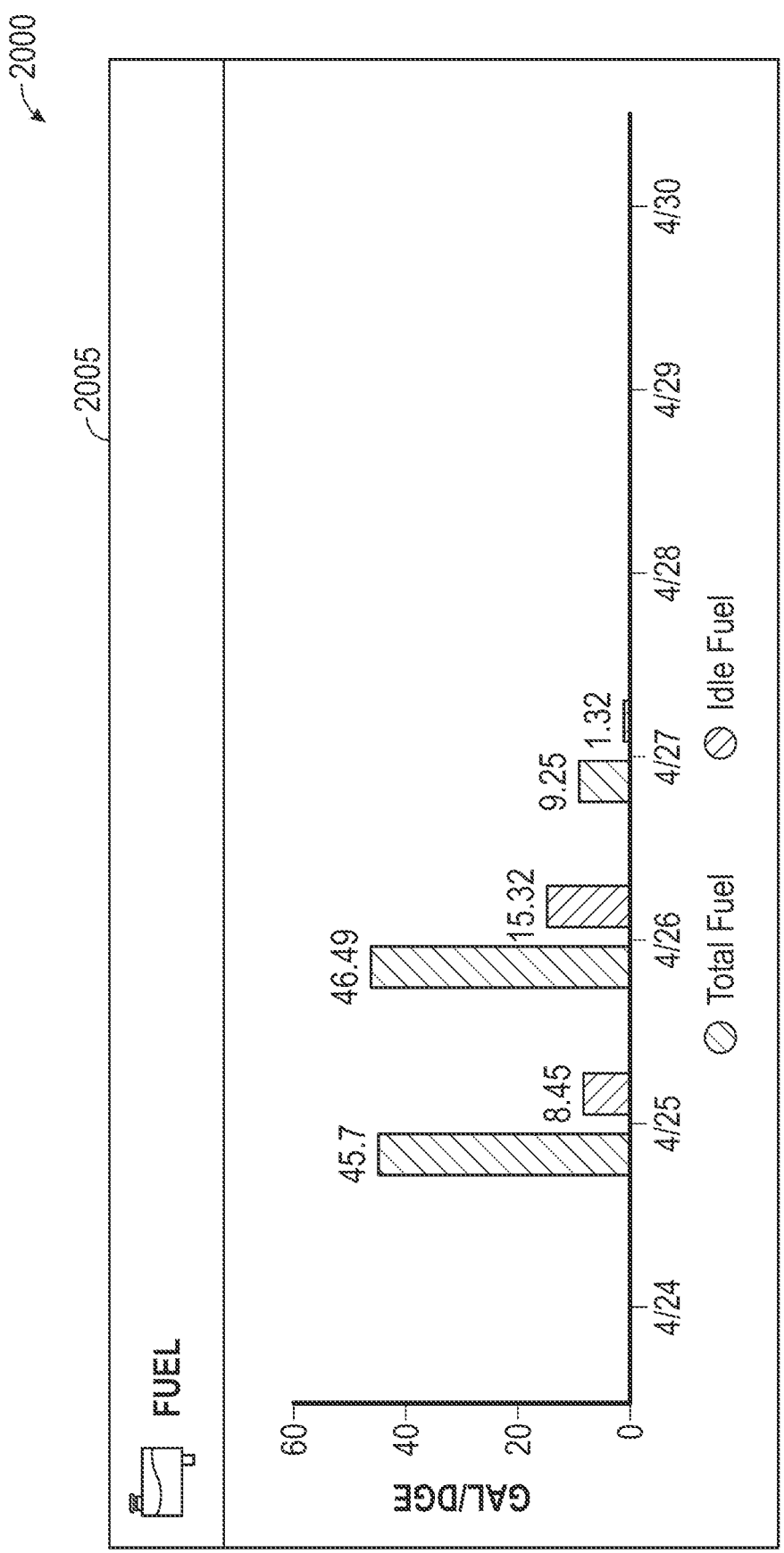
FIG. 20 is a user interface displaying vehicle information, according to an exemplary embodiment.

Referring now to FIG. 20. A user interface 2000 is displayed. The user interface 2000 includes a graphical representation 2005 of information associated with a vehicle. For example, a total fuel amount and an idle fuel amount. In some embodiments, the data collection system 205 can generate the information displayed in FIG. 20. In some embodiments, the user interface 2000 can be provided to a display device (e.g., display device 225 or user device 220). In some embodiments, the information displayed in FIG. 20 can be included in a vehicle system report. In some embodiments, the user interface 500, the user interface 600, the user interface 700, the user interface 800, the user interface 900, the user interface 1000, the user interface 1100, the user interface 1200, the user interface 1300, the user interface 1400, the user interface 1500, the user interface 1600, the user interface 1700, the user interface 1800, the user interface 1900, and the user interface 2000 can be included within a single user interface (e.g., the user interfaces are combined).

Figure 21:
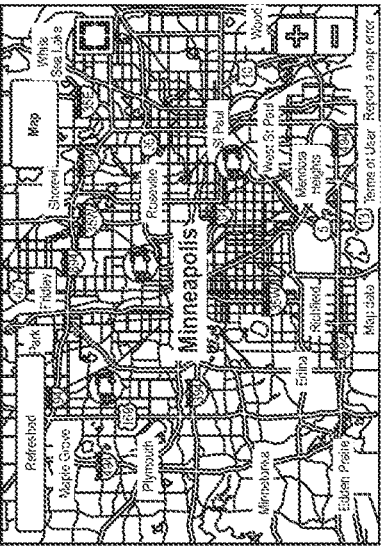
FIG. 21 is a user interface displaying a dashboard, according to an exemplary embodiment.

Referring now to FIG. 21. A user interface 2100 is displayed. The user interface 2100 includes one or more dashboards. For example, a summary dashboard 2105, a status dashboard 2110, a totals dashboard 2115, and an analytics dashboard 2120. A user can be presented with the information associated with the summary dashboard 2105 by selecting the summary tab. For example, an amount of faults (presented in box 2125), an amount of reported and not reported telematics information (presented in box 2150), a number of alerts (presented in box 2130), a number of arm lifts (presented in box 2145), an amount of idle time (presented in box 2140), an amount of fuel usage (presented in box 2135), and a map 2155. The map 2155 can include at least one of the maps described herein. Similarly, the map 2144 can include information similar to at least one of the maps described herein. In some embodiments, the user can determine the information that will be displayed in the user interface 2100.

The user can be presented with the information associated with the status dashboard 2110 by selecting the status tab. The user can be presented with the information associated with the totals dashboard 2115 by selecting the totals tab. The user can be presented with the information associated with the analytics dashboard 2120 by selecting the analytics tab. In some embodiments, the data collection system 205 can generate the information displayed in FIG. 21. In some embodiments, the user interface 2100 can be provided to a display device (e.g., display device 225 or user device 220). In some embodiments, the information displayed in FIG. 21 can be included in a vehicle system report. In some embodiments, the user interface 500, the user interface 600, the user interface 700, the user interface 800, the user interface 900, the user interface 1000, the user interface 1100, the user interface 1200, the user interface 1300, the user interface 1400, the user interface 1500, the user interface 1600, the user interface 1700, the user interface 1800, the user interface 1900, and the user interface 2000 can be included within the user interface 2100.

Referring now to FIG. 22. A user interface 2200 is included. The user interface 2200 is shown to be providing information associated with the status dashboard 2110. For example, a vehicle VIN, a status of the vehicle, a body fuse status, a hydraulic heater circuit status, a PTO status, a number of faults, and a last recorded timestamp. In some embodiments, the data collection system 205 can generate the information displayed in FIG. 22. In some embodiments, the user interface 2200 can be provided to a display device (e.g., display device 225 or user device 220). In some embodiments, the information displayed in FIG. 22 can be included in a vehicle system report. In some embodiments, the user interface 500, the user interface 600, the user interface 700, the user interface 800, the user interface 900, the user interface 1000, the user interface 1100, the user interface 1200, the user interface 1300, the user interface 1400, the user interface 1500, the user interface 1600, the user interface 1700, the user interface 1800, the user interface 1900, and the user interface 2000 can be included within the user interface 2200. In some embodiments, a user can be directed to the status dashboard 2110 by selecting the status tab in FIG. 21.

Referring now to FIG. 23. A user interface 2300 is displayed. The user interface 2300 is shown to be providing information associated with the totals dashboard 2115. For example, a vehicle vin, an idle amount, an engine hours amount, a distance traveled, an amount of fuel, an amount of idle fuel, a peak daily speed, a lift count, an eject count, a packer count, a pump hours amount, a hydraulic peak temperature, and a last recorded timestamp. In some embodiments, the data collection system 205 can generate the information displayed in FIG. 23. In some embodiments, the user interface 2300 can be provided to a display device (e.g., display device 225 or user device 220). In some embodiments, the user interface 500, the user interface 600, the user interface 700, the user interface 800, the user interface 900, the user interface 1000, the user interface 1100, the user interface 1200, the user interface 1300, the user interface 1400, the user interface 1500, the user interface 1600, the user interface 1700, the user interface 1800, the user interface 1900, and the user interface 2000 can be included within the user interface 2300. In some embodiments, a user can be directed to the totals dashboard 2115 by selecting the totals tab in FIG. 21 or FIG. 22.

Figure 24:
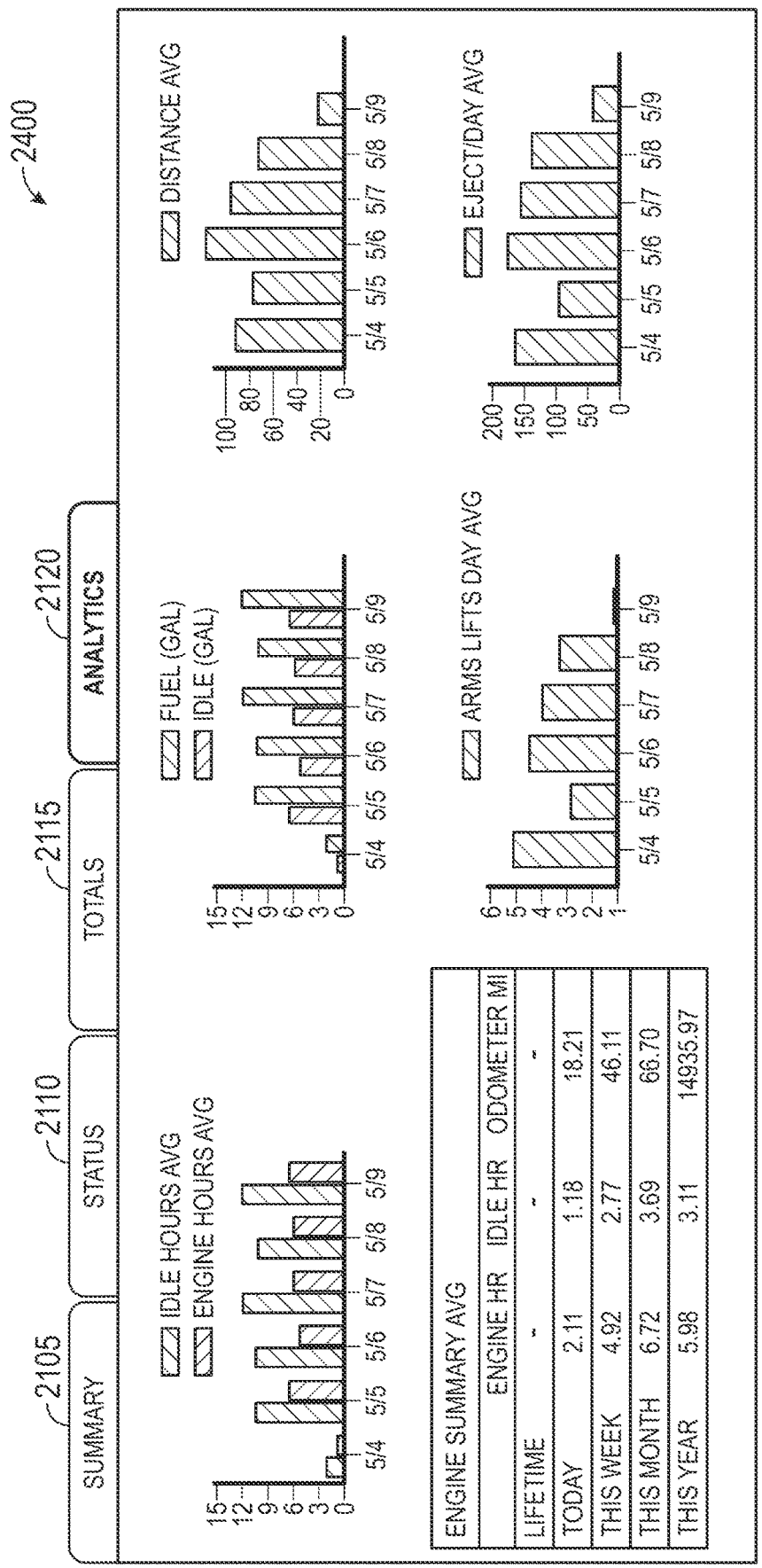
FIG. 24 is a user interface displaying a dashboard, according to an exemplary embodiment.

Referring now to FIG. 24. A user interface 2400 is displayed. The user interface 2400 is shown providing information associated with the analytics dashboard 2120. For example, a graphical representation of idle hours and engine hours, a graphical representation of a fuel amount and an idle fuel amount, a graphical representation of distanced travelled, a graphical representation of arm lifts, a graphical representation of ejects and an engine summary. In some embodiments, the data collection system 205 can generate the information displayed in FIG. 24. In some embodiments, the user interface 2400 can be provided to a display device (e.g., display device 225 or user device 220). In some embodiments, the information displayed in FIG. 24 can be included in a vehicle system report. In some embodiments, the user interface 500, the user interface 600, the user interface 700, the user interface 800, the user interface 900, the user interface 1000, the user interface 1100, the user interface 1200, the user interface 1300, the user interface 1400, the user interface 1500, the user interface 1600, the user interface 1700, the user interface 1800, the user interface 1900, and the user interface 2000 can be included within the user interface 2400. In some embodiments, a user can be directed to the analytics dashboard 2120 by selecting the analytics tab in FIG. 21, FIG. 22 or FIG. 23.

Figure 25:
FIG. 25 is a user interface displaying a date icon, according to an exemplary embodiment.

Referring now to FIG. 25. A user interface 2500 is displayed. The user interface 2500 includes tabs 2505, 2510, and 2515 that can be used to adjust the dates associated with vehicle information. In some embodiments, the tabs 2505, 2510, and 2515 can be included in at least one of the user interface 500, the user interface 600, the user interface 700, the user interface 800, the user interface 900, the user interface 1000, the user interface 1100, the user interface 1200, the user interface 1300, the user interface 1400, the user interface 1500, the user interface 1600, the user interface 1700, the user interface 1800, the user interface 1900, the user interface 2000, the user interface 2100, the user interface 2200, the user interface 2300, or the user interface 2400.

Figure 26:
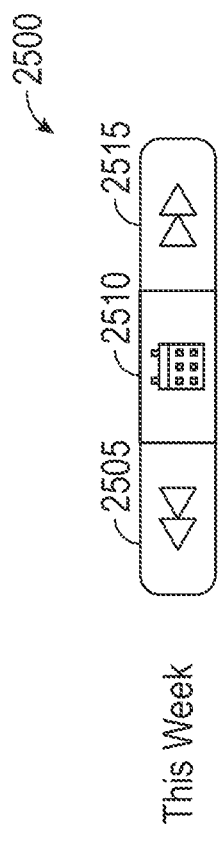
FIG. 26 is a user interface displaying vehicle information, according to an exemplary embodiment.

Referring now to FIG. 26. A user interface 2600 is displayed. The user interface 2600 includes information associated with a vehicle. The user interface 2600 includes icons 2605, 2610, 2615, 2620, and 2625. The icon 2605 can provide information pertaining to a status of an engine coolant level. The icon 2610 can provide information pertaining to an engine oil level. The icon 2615 can provide information pertaining to a battery voltage. The icon 2620 can provide information associated with the mileage of the vehicle. The icon 2625 can illustrate a gear of a vehicle. The icon 2625 can display the vehicle being in at least one of park, reverse, neutral or drive. FIG. 26 depicts an example of the icon 2625 illustrating that the vehicle is in drive.

In some embodiments, the data collection system 205 can generate the information displayed in FIG. 26. In some embodiments, the user interface 2600 can be provided to a display device (e.g., display device 225 or user device 220). In some embodiments, the user interface 2600 and at least one of the user interface 500, the user interface 600, the user interface 700, the user interface 800, the user interface 900, the user interface 1000, the user interface 1100, the user interface 1200, the user interface 1300, the user interface 1400, the user interface 1500, the user interface 1600, the user interface 1700, the user interface 1800, the user interface 1900, the user interface 2000, the user interface 2100, the user interface 2200, the user interface 2300, or the user interface 2400 can be included within a single user interface (e.g., the user interfaces are combined).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system 200 as shown in the various exemplary embodiments is illustrative only. Additionally, any element disclosed in one embodiment may be incorporated or utilized with any other embodiment disclosed herein. For example, the refuse vehicle 20 of the exemplary embodiment shown in at least FIG. 3 may be incorporated in the system 200 of the exemplary embodiment shown in at least FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system, comprising:
 a vehicle, including:
  a device configured to collect data pertaining to a plurality of operations of the vehicle; and
  one or more processing circuits, in communication with the device, configured to:
   receive, from the device responsive to a performance of at least one operation of the plurality of operations of the vehicle, via a communication channel between the device and the one or more processing circuits, data pertaining to the at least one operation of the plurality of operations of the vehicle;

determine, using the data pertaining to that at least one operation of the plurality of operations of the vehicle, that the plurality of operations of the vehicle include a number of vehicle backups performed by the vehicle along a route taken by the vehicle;

determine a difference between the number of vehicle backups and a predetermined number of vehicle backups;

provide, to a user device, a user interface that displays an indication of the number of vehicle backups and the difference between the number of vehicle backups and the predetermined number of vehicle backups;

present, via the user interface, a prompt for input, from an operator of the vehicle, to identify one or more factors that contributed to an occurrence of at least one vehicle backup of the number of vehicle backups;

receive, via the user interface, at least one response to the prompt that identifies the one or more factors;

determine, using the one or more factors, that an opportunity to avoid subsequent occurrences of the at least one vehicle backup exists; and update, responsive to determination, the user interface to display an indication of the opportunity to avoid the subsequent occurrences of the at least one vehicle backup.

2. The system of claim 1, wherein the one or more processing circuits are further configured to:

associate, using location information included in the data pertaining to the at least one operation of the plurality of operations of the vehicle, the number of vehicle backups performed by the vehicle with the route taken by the vehicle.

3. The system of claim 2, wherein the one or more processing circuits are further configured to:

identify, using the data pertaining to the at least one operation of the plurality of operations of the vehicle, a plurality of tasks included along the route taken by the vehicle;

generate, using second location information associated with the plurality of tasks included along the route taken by the vehicle, a second route to reduce one or more subsequent occurrences of the number of vehicle backups, the second route including access to the plurality of tasks included along the route taken by the vehicle; and generate, responsive to generating the second route, a report indicating that subsequent performance of the plurality of tasks of the vehicle be performed along the second route.

4. The system of claim 1, wherein the one or more processing circuits are further configured to:

receive second data pertaining to a second plurality of operations performed by a second vehicle;

identify, using information associated with the vehicle the operator associated with the vehicle;

identify, using information associated with the second vehicle, a second operator of the second vehicle;

determine, using the second data pertaining to the second plurality of operations, a second number of vehicle backups performed by the second vehicle along the route; and generate, using the number of vehicle backups performed by the vehicle and the second number of vehicle backups performed by the second vehicle, a report to indicate (i) actions taken by the operator that resulted in the number of vehicle backups performed by the vehicle or (ii) actions taken by the second operator that resulted in the second number of vehicle backups performed by the second vehicle.

5. The system of claim 1, wherein the one or more processing circuits are further configured to:

generate a report to identify the one or more factors and at least one recommendation to handle subsequent instances of the one or more factors; and provide, to a second user device associated with the operator of the vehicle, the report.

6. The system of claim 1, wherein the user interface includes a plurality of graphical representations having a plurality of selectable elements, and wherein the one or more processing circuits are further configured to:

detect, via the user interface, a selection of a first selectable element of the plurality of selectable elements, the first selectable element of the plurality of selectable elements pertaining to a given graphical representation of the plurality of graphical representations; and update the user interface to display information pertaining to (i) a given vehicle backup of the number of vehicle backups or (ii) a given task of a plurality of tasks, wherein the given vehicle backup of the number of vehicle backups or the given task of the plurality of tasks is represented by the given graphical representation of the plurality of graphical representations.

7. A method, comprising:

receiving, from a device of a vehicle, responsive to performance of at least one operation of a plurality of operations of the vehicle, data pertaining to the at least one operation of the plurality of operations of the vehicle;

determining, using the data pertaining to that at least one operation of the plurality of operations of the vehicle, that the plurality of operations of the vehicle include a number of vehicle backups performed by the vehicle along a route taken by the vehicle;

determining a difference between the number of vehicle backups and a predetermined number of vehicle backups;

providing, to a user device, a user interface that displays an indication of the number of vehicle backups and the difference between the number of vehicle backups and the predetermined number of vehicle backups;

presenting, via the user interface, a prompt for input, from an operator of the vehicle, to identify one or more factors that contributed to an occurrence of at least one vehicle backup of the number of vehicle backups;

receiving, via the user interface, at least one response to the prompt that identifies the one or more factors;

determining, using the one or more factors, that an opportunity to avoid subsequent occurrences of the at least one vehicle backup exists; and updating, responsive to determination, the user interface to display an indication of the opportunity to avoid the subsequent occurrences of the at least one vehicle backup.

8. The method of claim 7, further comprising:

identifying, using the data pertaining to the at least one operation of the plurality of operations of the vehicle, a plurality of tasks included along the route taken by the vehicle;

generating, using second location information associated with the plurality of tasks included along the route taken by the vehicle, a second route to reduce one or more subsequent occurrences of the number of vehicle backups, the second route including access to the plurality of tasks included along the route taken by the vehicle; and
generating, responsive to generating the second route, a report indicating that subsequent performance of the plurality of tasks of the vehicle be performed along the second route.

9. The method of claim 7, further comprising:
receiving second data pertaining to a second plurality of operations performed by a second vehicle;
identifying, using information associated with the vehicle, the operator associated with the vehicle;
identifying, using information associated with the second vehicle, a second operator of the second vehicle; and
determining, using the second data pertaining to the second plurality of operations, a second number of vehicle backups performed by the second vehicle along the route; and generate, using the number of vehicle backups performed by the vehicle and the second number of vehicle backups performed by the second vehicle, a report to indicate (i) actions taken by the operator that resulted in the number of vehicle backups performed by the vehicle or (ii) actions taken by the second operator that resulted in the second number of vehicle backups performed by the second vehicle.

10. The method of claim 7, further comprising:
generating a report to identify the one or more factors and at least one recommendation to handle subsequent instances of the one or more factors; and
providing, to a second user device associated with the operator of the vehicle, the report.

11. The method of claim 7, further comprising:
updating the user interface to display information pertaining to (i) a given vehicle backup of the number of vehicle backups or (ii) a given task of a plurality of tasks.

* * * * *